(12) United States Patent
Zhu

(10) Patent No.: US 11,929,942 B2
(45) Date of Patent: Mar. 12, 2024

(54) METHOD AND DEVICE FOR NETWORK TRAFFIC SCHEDULING

(71) Applicant: Huawei Cloud Computing Technologies Co., Ltd., Guizhou (CN)

(72) Inventor: Xiaoping Zhu, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/848,870

(22) Filed: Jun. 24, 2022

(65) Prior Publication Data

US 2022/0329541 A1  Oct. 13, 2022

Related U.S. Application Data

(63) Continuation of application No. PCT/CN2020/138041, filed on Dec. 21, 2020.

(30) Foreign Application Priority Data

Dec. 26, 2019 (CN) .......................... 201911371876.6

(51) Int. Cl.
*H04L 47/70* (2022.01)
*H04L 41/0896* (2022.01)

(52) U.S. Cl.
CPC ........ *H04L 47/823* (2013.01); *H04L 41/0896* (2013.01); *H04L 47/826* (2013.01)

(58) Field of Classification Search
CPC .............. H04L 47/823; H04L 41/0896; H04L 41/0897; H04L 47/826; H04L 47/83; H04L 47/703

USPC .......................................................... 709/226
See application file for complete search history.

(56) References Cited

U.S. PATENT DOCUMENTS

| | | | | |
|---|---|---|---|---|
| 11,683,102 B1* | 6/2023 | Zhang | ................ | H04B 10/6932 398/202 |
| 2003/0221008 A1* | 11/2003 | England | .................. | H04L 47/26 709/226 |
| 2007/0002743 A1 | 1/2007 | Fan | | |
| 2013/0275578 A1* | 10/2013 | Williams | ............ | H04L 43/0882 709/224 |
| 2016/0088649 A1* | 3/2016 | Xia | ........................ | H04W 72/52 370/329 |
| 2017/0149688 A1* | 5/2017 | Chitti | .................. | H04L 41/0896 |

FOREIGN PATENT DOCUMENTS

| | | |
|---|---|---|
| CN | 104168100 A | 11/2014 |
| CN | 104967528 A | 10/2015 |
| CN | 105338575 A | 2/2016 |

(Continued)

*Primary Examiner* — Hee Soo Kim
(74) *Attorney, Agent, or Firm* — Conley Rose, P.C.

(57) ABSTRACT

A bandwidth scheduling method includes receiving a bandwidth request sent by a data center, where the bandwidth request includes bandwidth required to transmit non-real-time traffic; allocating, based on historical bandwidth information, the bandwidth required by the data center to transmit the non-real-time traffic in a future time period, where the historical bandwidth information is used to predict occupation of total bandwidth by the data center in a region in which the data center is located at each moment in the future time period; and sending a bandwidth response to the data center, where the bandwidth response includes an allocation result.

20 Claims, 11 Drawing Sheets

(56) References Cited

FOREIGN PATENT DOCUMENTS

| | | | | |
|---|---|---|---|---|
| CN | 105471759 | A | 4/2016 | |
| CN | 105591795 | A | 5/2016 | |
| CN | 106549782 | A | 3/2017 | |
| CN | 104365061 | B | 12/2017 | |
| CN | 107465708 | A | 12/2017 | |
| CN | 105471759 | B * | 6/2018 | ............. H04L 47/10 |
| CN | 108989238 | A | 12/2018 | |
| CN | 109361622 | A | 2/2019 | |
| CN | 109510715 | A | 3/2019 | |
| CN | 109617836 | A | 4/2019 | |
| CN | 109921950 | A | 6/2019 | |
| CN | 110138830 | A | 8/2019 | |
| CN | 110198543 | A | 9/2019 | |
| CN | 110474852 | A | 11/2019 | |
| CN | 110493072 | A | 11/2019 | |

\* cited by examiner

METHOD AND DEVICE FOR NETWORK TRAFFIC SCHEDULING

CROSS-REFERENCE TO RELATED APPLICATIONS

This is a continuation of International Patent Application No. PCT/CN2020/138041, filed on Dec. 21, 2020, which claims priority to Chinese Patent Application No. 201911371876.6 filed on Dec. 26, 2019. The disclosure of the aforementioned applications are hereby incorporated by reference in their entireties.

TECHNICAL FIELD

The present disclosure relates to the field of information technologies (IT), and in particular, to a bandwidth scheduling method, a traffic transmission method, and a related product.

BACKGROUND

A public cloud usually has a plurality of regions, and each region includes one or more data centers. Data centers in regions are connected through a data center interconnection (DCI) network. The DCI network includes three lines: a physical line, a logical line, and a virtual line. The physical line is an optical fiber, a channel, or the like leased from an operator or established by an owner of the public cloud. The logical line is a logical path created on the physical line. The virtual line is a point-to-point virtual path created on the physical line. The data centers in the regions transmit traffic through physical lines in the DCI network. To avoid packet loss during transmission, it needs to ensure that bandwidth of the physical lines is greater than peak traffic during transmission. Therefore, the physical lines are usually expanded based on the peak traffic.

However, after the physical lines are expanded, a large quantity of physical lines are not used in traffic transmission valley. In this case, physical line resources are wasted due to low utilization of the physical lines.

SUMMARY

This disclosure provides a bandwidth scheduling method, a traffic transmission method, and a related product, to allocate, based on historical bandwidth information, bandwidth required by a data center to transmit non-real-time traffic, thereby improving utilization of physical line resources in the data center.

According to a first aspect, an embodiment of this disclosure provides a bandwidth scheduling method, applied to a scheduling platform, and including: receiving a bandwidth request sent by a data center, where the bandwidth request includes bandwidth required to transmit non-real-time traffic; allocating, based on historical bandwidth information, the bandwidth required by the data center to transmit the non-real-time traffic in a future time period, where the historical bandwidth information is used to predict occupation of total bandwidth by the data center in a region in which the data center is located at each moment in the future time period; and sending a bandwidth response to the data center, where the bandwidth response includes an allocation result.

It can be learned that, in this embodiment of this disclosure, the scheduling platform allocates, based on the occupation of the total bandwidth by the data center in the region in which the data center is located at each moment in the future time period, the bandwidth required by the data center to transmit the non-real-time traffic, so that the total bandwidth is occupied evenly when the data center transmits traffic at each moment in the future time period. Therefore, when a large amount of traffic needs to be transmitted in the future time period, the traffic can be transmitted without expanding a physical line. In addition, a case in which a traffic peak is far greater than a traffic valley is avoided through scheduling, so that when the data center transmits traffic in the traffic valley, many physical line resources are also used, thereby improving utilization of physical line resources in the data center.

In a possible implementation, the historical bandwidth information includes first bandwidth information, the first bandwidth information includes predicted occupation of the total bandwidth by real-time traffic at each moment in the future time period, and a data transmission priority of the real-time traffic is higher than a data transmission priority of the non-real-time traffic; and the allocating, based on historical bandwidth information, the bandwidth required by the data center to transmit the non-real-time traffic in a future time period includes: determining schedulable bandwidth in the region at each moment in the future time period based on the total bandwidth and the first bandwidth information; and allocating, based on the schedulable bandwidth in the region at each moment in the future time period, the bandwidth required to transmit the non-real-time traffic.

In this implementation of this disclosure, the schedulable bandwidth in the region at each moment in the future time period is determined based on the predicted occupation of the total bandwidth by the real-time traffic at each moment in the future time period. After the schedulable bandwidth at each moment is available, the bandwidth required by the data center to transmit the non-real-time traffic may be accurately allocated.

In a possible implementation, the historical bandwidth information includes second bandwidth information, and the second bandwidth information includes predicted occupation of the total bandwidth by new non-real-time traffic added in the future time period at each moment in the future time period; and the allocating, based on historical bandwidth information, the bandwidth required by the data center to transmit the non-real-time traffic in a future time period includes: determining schedulable bandwidth in the region at each moment in the future time period based on the total bandwidth, the first bandwidth information, and the second bandwidth information; and allocating, based on the schedulable bandwidth in the region at each moment in the future time period, the bandwidth required to transmit the non-real-time traffic.

In this implementation, when the schedulable bandwidth is determined, not only the occupation of the total bandwidth by the real-time traffic in the future time period is considered, but also the occupation of the total bandwidth by the added non-real-time traffic is considered. If a transmission priority of the added non-real-time traffic is higher than a data transmission priority of the non-real-time traffic, when the non-real-time traffic is transmitted, bandwidth allocated to the added non-real-time traffic cannot be occupied, that is, the bandwidth occupied by the added non-real-time traffic needs to be subtracted from the schedulable bandwidth, so that the determined available bandwidth more conforms to a real situation, and the bandwidth allocated to the data center to transmit the non-real-time traffic is more accurate.

In a possible implementation, the allocating, based on the schedulable bandwidth in the region at each moment in the future time period, the bandwidth required to transmit the non-real-time traffic includes: allocating a plurality of time slices to transmit the non-real-time traffic in the future time period; determining, based on the schedulable bandwidth in the region at each moment in the future time period, schedulable bandwidth corresponding to each time slice; allocating, based on bandwidth required to transmit the real-time traffic, available bandwidth to transmit the non-real-time traffic from the schedulable bandwidth corresponding to each time slice; and creating, based on the plurality of time slices and an available bandwidth corresponding to each time slice, a transmission channel corresponding to each time slice to transmit the non-real-time traffic, where the allocation result includes the plurality of time slices, the available bandwidth corresponding to each time slice, and the transmission channel corresponding to each time slice.

In a possible implementation, when transmission of the non-real-time traffic supports resumable transmission, the plurality of time slices are continuous or discontinuous; or when transmission of the non-real-time traffic does not support resumable transmission, the plurality of time slices are continuous.

In this implementation, different types of time slices can be allocated to the data center based on a feature of the non-real-time traffic, thereby improving flexibility of allocating the schedulable bandwidth, and allocating bandwidth to transmit non-real-time traffic in various bandwidth scheduling scenarios. For example, bandwidth of 20 megabytes (MB) is required to transmit the non-real-time traffic, and transmission time is 5 second (s). However, schedulable bandwidth in any continuous time slice in the future time period is not always greater than 20 MB. If the non-real-time traffic supports the resumable transmission, several discontinuous time slices whose schedulable bandwidth is greater than 20 MB may be allocated, so as to allocate the bandwidth required to transmit the non-real-time traffic.

In a possible implementation, the bandwidth request further includes bandwidth required by the data center to transmit current real-time traffic; and the method further includes: predicting, based on the historical bandwidth information, bandwidth required to transmit real-time traffic of the data center at a current moment; determining that a difference between the bandwidth required by the data center to transmit the current real-time traffic and the predicted bandwidth required to transmit the real-time traffic of the data center at the current moment is greater than a threshold; and updating the historical bandwidth information based on historical traffic information of the region within a preset time period.

In this implementation, before the bandwidth is allocated, whether the predicted occupation of the bandwidth by the real-time traffic in the future time period and the current real-time traffic are within an error range is first determined. If the predicted occupation of the bandwidth by the real-time traffic in the future time period and the current real-time traffic are not within the error range, it indicates that the historical bandwidth information predicted based on a large amount of historical traffic information does not conform to a distribution rule of the current real-time traffic. Therefore, the historical bandwidth information is updated based on the historical traffic information within the preset time, so that the bandwidth historical bandwidth information conforms to a real situation, thereby improving precision of allocating the bandwidth required to transmit the non-real-time traffic.

In a possible implementation, the historical bandwidth information includes a timestamp, a 5-tuple, a packet size, a sampling ratio, a correspondence between a 5-tuple and an application ID, and link bandwidth.

According to a second aspect, an embodiment of this disclosure provides a traffic transmission method, applied to a data center and including: sending a bandwidth request to a scheduling platform, where the bandwidth request includes bandwidth required to transmit non-real-time traffic; receiving a bandwidth response sent by the scheduling platform, where the bandwidth response includes an allocation result, the allocation result is obtained by allocating, by the scheduling platform based on historical bandwidth information, the bandwidth required by the data center to transmit the non-real-time traffic in a future time period, and the historical bandwidth information is used to predict occupation of total bandwidth by the data center in a region in which the data center is located at each moment in the future time period; and transmitting the non-real-time traffic based on the allocation result.

It can be learned that, in this embodiment of this disclosure, the allocation result is obtained by allocating, by the scheduling platform, based on the occupation of the total bandwidth by the data center in the region in which the data center is located at each moment in the future time period, the bandwidth required by the data center to transmit the non-real-time traffic, so that the total bandwidth in the region is occupied evenly when traffic is transmitted in the region at each moment in the future time period. Therefore, when a large amount of traffic needs to be transmitted in the future time period, the traffic can be transmitted without expanding a physical line. In addition, a case in which a traffic peak is far greater than a traffic valley is avoided through scheduling, so that when the data center transmits traffic in the traffic valley, many physical line resources are also used, thereby improving utilization of physical line resources in the data center.

In a possible implementation, the data center includes a first scheduler; and the sending a bandwidth request to a scheduling platform includes: sending a first transmission request to the first scheduler by using a service frontend, where the first transmission request includes a source address, a destination address, bandwidth, a traffic size, a command line, whether resumable transmission is supported, and a deadline; and sending the bandwidth request to the scheduling platform by using the scheduler, where the bandwidth request is registered by the service frontend with the first scheduler by using the first transmission request; and the transmitting the non-real-time traffic based on the allocation result includes: sending the allocation result to a service backend by using the first scheduler, to trigger the service backend to execute a traffic transmission task, where the traffic transmission task includes transmitting the non-real-time traffic based on the allocation result.

In this implementation, when different applications transmit traffic, different threads can be used to trigger the traffic transmission task. A corresponding transmission manner is set to transmit traffic by using an asynchronous thread, and a traffic transmission manner is added, so as to adapt to different types of applications.

In a possible implementation, the data center includes a first scheduler; and the sending a bandwidth request to a scheduling platform includes: sending a second transmission request to the first scheduler via a service, and buffering the to-be-transmitted non-real-time traffic into a buffer pool, where the second transmission request includes a source address, a destination address, bandwidth, a traffic size, a source traffic location, a destination traffic location, and a deadline; and sending the bandwidth request to the scheduling platform by using the first scheduler, where the bandwidth request is obtained by the first scheduler based on the second transmission request; and the transmitting the non-real-time traffic based on the allocation result includes: sending the allocation result to a controller of the buffer pool by using the first scheduler, to trigger the controller to execute a traffic transmission task, where the traffic transmission task includes transmitting the non-real-time traffic based on the allocation result.

In this implementation, when different applications transmit traffic, different threads can be used to trigger the traffic transmission task. A corresponding transmission manner is set to transmit traffic by using the buffer pool, and a traffic transmission manner is added, so as to adapt to different types of applications.

In a possible implementation, the data center includes a first scheduler; and the sending a bandwidth request to a scheduling platform includes: sending a third transmission request to the first scheduler via a service; and sending the bandwidth request to the scheduling platform by using the first scheduler, where the bandwidth request is obtained by the first scheduler based on the third transmission request; and the transmitting the non-real-time traffic based on the allocation result includes: sending the allocation result to the cloud service by using the first scheduler, to trigger the service to execute a traffic transmission task, where the traffic transmission task includes transmitting the non-real-time traffic based on the allocation result.

In this implementation, when different applications transmit traffic, different threads can be used to trigger the traffic transmission task. A corresponding transmission manner is set to transmit traffic by using a synchronization thread, and a traffic transmission manner is added, so as to adapt to different types of applications.

In a possible implementation, the allocation result includes a plurality of time slices, available bandwidth corresponding to each time, and a transmission channel corresponding to each time slice; and the transmitting the non-real-time traffic based on the allocation result includes: transmitting, based on the plurality of time slices and the available bandwidth corresponding to each time, the non-real-time traffic on the transmission channel corresponding to each time slice.

In a possible implementation, when transmission of the non-real-time traffic supports resumable transmission, the plurality of time slices are continuous or discontinuous; or when transmission of the non-real-time traffic does not support resumable transmission, the plurality of time slices are continuous.

In this implementation, the scheduling platform can allocate different types of time slices to the data center based on a feature of the non-real-time traffic, thereby improving flexibility of allocating the schedulable bandwidth, and allocating bandwidth to transmit non-real-time traffic in various bandwidth scheduling scenarios. For example, bandwidth of 20 MB is required to transmit the non-real-time traffic, and transmission time is 5 s. However, schedulable bandwidth in any continuous time slice in the future time period is not always greater than 20 MB. If the non-real-time traffic supports the resumable transmission, several discontinuous time slices whose schedulable bandwidth is greater than 20 MB may be allocated, so as to allocate the bandwidth required to transmit the non-real-time traffic.

According to a third aspect, an embodiment of this disclosure provides a scheduling platform including: a transceiver module, configured to receive a bandwidth request sent by a data center, where the bandwidth request includes bandwidth required to transmit non-real-time traffic; and a processing module, configured to allocate, based on historical bandwidth information, the bandwidth required by the data center to transmit the non-real-time traffic in a future time period, where the historical bandwidth information is used to predict occupation of total bandwidth by the data center in a region in which the data center is located at each moment in the future time period, where the transceiver module is further configured to send a bandwidth response to the data center, where the bandwidth response includes an allocation result.

In a possible implementation, the historical bandwidth information includes first bandwidth information, the first bandwidth information includes predicted occupation of the total bandwidth by real-time traffic at each moment in the future time period, and a data transmission priority of the real-time traffic is higher than a data transmission priority of the non-real-time traffic; and in an aspect of allocating, based on historical bandwidth information, the bandwidth required by the data center to transmit the non-real-time traffic in a future time period, the processing module is configured to: determine schedulable bandwidth in the region at each moment in the future time period based on the total bandwidth and the first bandwidth information; and allocate, based on the schedulable bandwidth in the region at each moment in the future time period, the bandwidth required to transmit the non-real-time traffic.

In a possible implementation, the historical bandwidth information includes second bandwidth information, and the second bandwidth information includes predicted occupation of the total bandwidth by new non-real-time traffic added in the future time period at each moment in the future time period; and in an aspect of allocating, based on historical bandwidth information, the bandwidth required by the data center to transmit the non-real-time traffic in a future time period, the processing module is configured to: determine schedulable bandwidth in the region at each moment in the future time period based on the total bandwidth, the first bandwidth information, and the second bandwidth information; and allocate, based on the schedulable bandwidth in the region at each moment in the future time period, the bandwidth required to transmit the non-real-time traffic.

In a possible implementation, in an aspect of allocating, based on the schedulable bandwidth in the region at each moment in the future time period, the bandwidth required to transmit the non-real-time traffic, the processing module is configured to: allocate a plurality of time slices to transmit the non-real-time traffic in the future time period; determine, based on the schedulable bandwidth in the region at each moment in the future time period, schedulable bandwidth corresponding to each time slice; allocate, based on bandwidth required to transmit the real-time traffic, available bandwidth to transmit the non-real-time traffic from the schedulable bandwidth corresponding to each time slice; and create, based on the plurality of time slices and an available bandwidth corresponding to each time slice, a transmission channel corresponding to each time slice to transmit the non-real-time traffic, where the allocation result includes the plurality of time slices, the available bandwidth corresponding to each time slice, and the transmission channel corresponding to each time slice.

In a possible implementation, when transmission of the non-real-time traffic supports resumable transmission, the plurality of time slices are continuous or discontinuous; or when transmission of the non-real-time traffic does not support resumable transmission, the plurality of time slices are continuous.

In a possible implementation, the bandwidth request further includes bandwidth required by the data center to transmit current real-time traffic; and the processing module is further configured to: predict, based on the historical bandwidth information, bandwidth required to transmit real-time traffic of the data center at a current moment; determine that a difference between the bandwidth required by the data center to transmit the current real-time traffic and the predicted bandwidth required to transmit the real-time traffic of the data center at the current moment is greater than a threshold; and update the historical bandwidth information based on historical traffic information of the region within a preset time period.

In a possible implementation, the historical bandwidth information includes a timestamp, a 5-tuple, a packet size, a sampling ratio, a correspondence between a 5-tuple and an application ID, and link bandwidth.

According to a fourth aspect, an embodiment of this disclosure provides a data center including: a transceiver module, configured to send a bandwidth request to a scheduling platform, where the bandwidth request includes bandwidth required to transmit non-real-time traffic, where the transceiver module is further configured to receive a bandwidth response sent by the scheduling platform, where the bandwidth response includes an allocation result, the allocation result is obtained by allocating, by the scheduling platform based on historical bandwidth information, the bandwidth required by the data center to transmit the non-real-time traffic in a future time period, and the historical bandwidth information is used to predict occupation of total bandwidth by the data center in a region in which the data center is located at each moment in the future time period; and a processing module, configured to transmit the non-real-time traffic based on the allocation result.

In a possible implementation, the data center includes a first scheduler; and in an aspect of sending a bandwidth request to a scheduling platform, the transceiver module is configured to: send a first transmission request to the scheduler by using a service frontend, where the first transmission request includes a source address, a destination address, bandwidth, a traffic size, a command line, whether resumable transmission is supported, and a deadline; and send the bandwidth request to the scheduling platform by using the scheduler, where the bandwidth request is registered by the service frontend with the scheduler by using the first transmission request; and in an aspect of transmitting the non-real-time traffic based on the allocation result, the processing module is configured to: send the allocation result to a service backend by using the first scheduler, to trigger the service backend to execute a traffic transmission task, where the traffic transmission task includes transmitting the non-real-time traffic based on the allocation result.

In a possible implementation, the data center includes a first scheduler; and in an aspect of sending a bandwidth request to a scheduling platform, the transceiver module is configured to: send a second transmission request to the first scheduler via a service, and buffer the to-be-transmitted non-real-time traffic into a buffer pool, where the second transmission request includes a source address, a destination address, bandwidth, a traffic size, a source traffic location, a destination traffic location, and a deadline; and send the bandwidth request to the scheduling platform by using the first scheduler, where the bandwidth request is obtained by the first scheduler based on the second transmission request; and in an aspect of transmitting the non-real-time traffic based on the allocation result, the processing unit is configured to: send the allocation result to a controller of the buffer pool by using the first scheduler, to trigger the controller to execute a traffic transmission task, where the traffic transmission task includes transmitting the non-real-time traffic based on the allocation result.

In a possible implementation, the data center includes a first scheduler; and in an aspect of sending a bandwidth request to a scheduling platform, the transceiver module is configured to: send a third transmission request to the first scheduler via a service; and send the bandwidth request to the scheduling platform by using the first scheduler, where the bandwidth request is obtained by the first scheduler based on the third transmission request; and in an aspect of transmitting the non-real-time traffic based on the allocation result, the processing module is configured to: send the allocation result to the cloud service by using the first scheduler, to trigger the service to execute a traffic transmission task, where the traffic transmission task includes transmitting the non-real-time traffic based on the allocation result.

In a possible implementation, the allocation result includes a plurality of time slices, available bandwidth corresponding to each time, and a transmission channel corresponding to each time slice; and in an aspect of transmitting the non-real-time traffic based on the allocation result, the processing module is configured to: transmit, based on the plurality of time slices and the available bandwidth corresponding to each time, the non-real-time traffic on the transmission channel corresponding to each time slice.

In a possible implementation, when transmission of the non-real-time traffic supports resumable transmission, the plurality of time slices are continuous or discontinuous; or when transmission of the non-real-time traffic does not support resumable transmission, the plurality of time slices are continuous.

According to a fifth aspect, an embodiment of this disclosure provides an electronic device including a processor and a memory. The processor runs code in the memory to perform the method according to the first aspect or the second aspect.

According to a sixth aspect, an embodiment of this disclosure provides a readable storage medium including instructions. When the instructions are run on a scheduling platform, the scheduling platform is enabled to perform the method according to the first aspect. When the instructions are run on a data center, the method according to the second aspect is performed.

DESCRIPTION OF EMBODIMENTS

Figure 1:
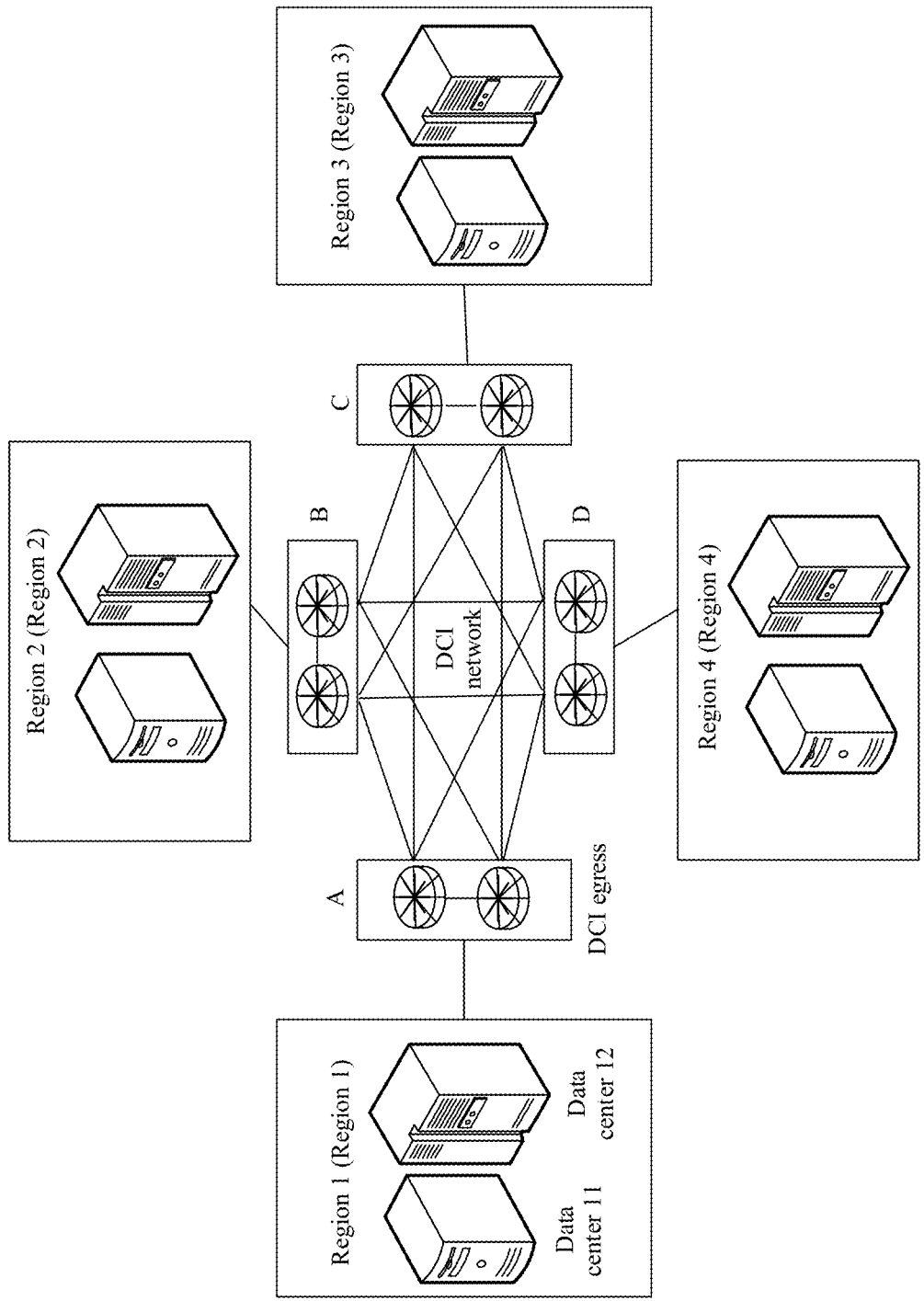
FIG. 1 is a diagram of a system architecture with a plurality of regions according to an embodiment of this disclosure.

As shown in FIG. 1, a public cloud usually has a plurality of regions, and each region includes one or more data centers. Data centers in regions are connected through a DCI network. The DCI network includes three lines: a physical line, a logical line, and a virtual line. The physical line is an optical fiber, a channel, or the like leased from an operator or established by an owner of the public cloud. The logical line is a logical path created on the physical line. The virtual line is a point-to-point virtual path created on the physical line, to transmit data between cross-region virtual private clouds (VPC).

Currently, traffic in the DCI network mainly includes traffic between VPCs in regions and traffic between cloud services in regions. When data is transmitted in the DCI network, the physical line is planned by using the logical line, and a physical line with a low load is preferably selected to transmit the data. However, the data is not transmitted continuously within a day in each region. Therefore, the traffic in the DCI network usually has an obvious tidal change within a day. As a result, a traffic peak and a traffic valley occur in the DCI network. In the traffic peak, the physical line cannot transmit current traffic even if being planned by using the logical link. Therefore, to avoid packet loss because the data centers in the regions transmit the traffic in the DCI network in the traffic peak, bandwidth of the physical lines is usually expanded based on the traffic peak. However, after the bandwidth of the physical lines is expanded, because a difference between the traffic peak and the traffic valley is large, a large quantity of physical lines are not used in the traffic valley in the DCI network. As a result, physical line resources are wasted due to low utilization of the physical lines.

For ease of understanding of this disclosure, related technological knowledge in embodiments of this disclosure is first described herein.

Real-time traffic: Real-time traffic needs to be transmitted immediately without delay. When a transmission moment of the real-time traffic arrives, the real-time traffic needs to be transmitted immediately without delay, and other traffic cannot occupy bandwidth allocated to the real-time traffic.

Non-real-time traffic: Non-real-time traffic is traffic that does not need to be transmitted immediately and can be transmitted with delay, and other traffic with a higher transmission priority can occupy bandwidth allocated to transmit the non-real-time traffic.

Whether to-be-transmitted traffic is real-time or non-real-time is configured by a user.

For example, it is preset that 100 MB real-time traffic needs to be transmitted starting from 12:00 noon. The real-time traffic needs to be immediately transmitted starting from 12:00 noon by using allocated bandwidth. Regardless of whether other traffic needs to be transmitted at 12:00, the bandwidth allocated to transmit the 100 MB real-time traffic cannot be occupied. If 120 MB non-real-time traffic needs to be transmitted starting from 6:00 p.m., available bandwidth allocated to the 120 MB non-real-time traffic may be set at or after 6:00 p.m. In addition, in a process of transmitting the 120 MB non-real-time traffic, if other traffic with a higher transmission priority needs to be transmitted, the bandwidth allocated to the non-real-time traffic may be occupied, and transmission of the non-real-time traffic is suspended first.

Bandwidth scheduling in this disclosure is allocating, when traffic is transmitted in each region, bandwidth required to transmit non-real-time traffic in each region. The bandwidth required to transmit the non-real-time traffic in the region is allocated periodically, and a scheduling period is preset. Therefore, the bandwidth allocation in each region is essentially allocating schedulable bandwidth to each region in the scheduling period at a scheduling moment (a start moment of each scheduling period), and allocating available bandwidth to transmit the non-real-time traffic in the region.

It should be noted that this disclosure is described by using an example in which bandwidth required to transmit non-real-time traffic in a region 10 is allocated when the region 10 transmits traffic to a region 20, and is described by using an example in which a first data center 101 in the region 10 transmits the non-real-time traffic to a second data center 201 in the region 20. A scheduling process in traffic transmission between other data centers in the region 10 and the region 20 and a scheduling process in traffic transmission between other regions are similar to this process, and details are not described again.

Figure 2:
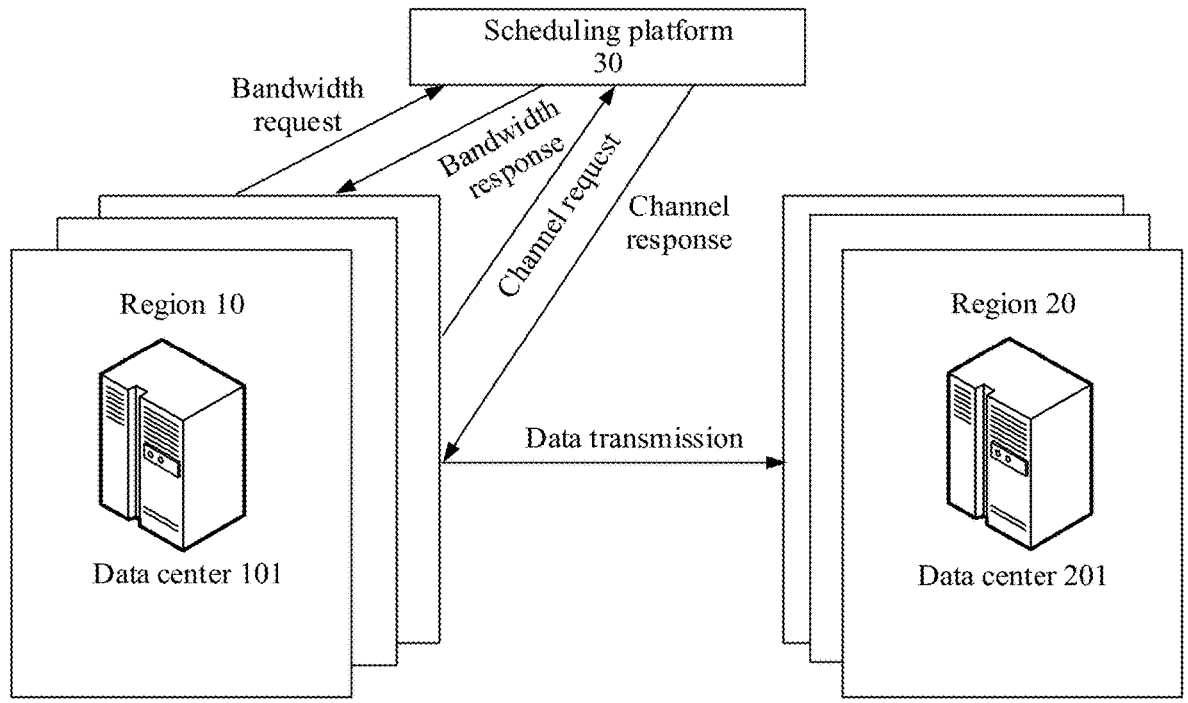
FIG. 2 is a diagram of a bandwidth scheduling system architecture according to an embodiment of this disclosure.

FIG. 2 is a diagram of a bandwidth scheduling system architecture according to an embodiment of this disclosure. The system architecture includes a region 10, a region 20, and a scheduling platform 30. The region 10 includes one or more data centers 101, and the region 20 includes one or more data centers 201.

When a current moment is a scheduling moment, the data center 101 sends a bandwidth request to the scheduling platform 30, where the bandwidth request includes bandwidth required by the data center 101 to transmit real-time traffic and non-real-time traffic at the current moment, and the bandwidth request is used to request the scheduling platform 30 to allocate bandwidth required by the data center 101 to transmit the non-real-time traffic in a future time period.

The future time period is a time period formed by a scheduling period corresponding to the scheduling moment. For example, if the scheduling period is 10 minutes and the scheduling moment is 10:00 a.m., the future time period is 10:00 a.m. to 10:10 a.m.

The scheduling platform 30 allocates, based on historical bandwidth information, the bandwidth required to transmit the non-real-time traffic to obtain a bandwidth response, and sends the bandwidth response to the data center 101, where the bandwidth response includes an allocation result. That is, the scheduling platform 30 predicts, based on the historical bandwidth information, occupation of total bandwidth in the region 10 in the future time period, determines schedulable bandwidth in the region 10 in the future time period based on the occupation, and allocates, based on the schedulable bandwidth, the bandwidth required by the data center 101 to transmit the non-real-time traffic.

The data center 101 sends a channel request to the scheduling platform 30, where the channel request is used to request the scheduling platform 30 to create a transmission channel corresponding to the allocation result.

The scheduling platform 30 creates, based on the channel request, the transmission channel corresponding to the bandwidth response, and sends a channel response to the data center 101, where the channel response includes the created transmission channel.

The data center 101 transmits the non-real-time traffic to the data center 201 based on the channel response and the bandwidth response.

Figure 3:
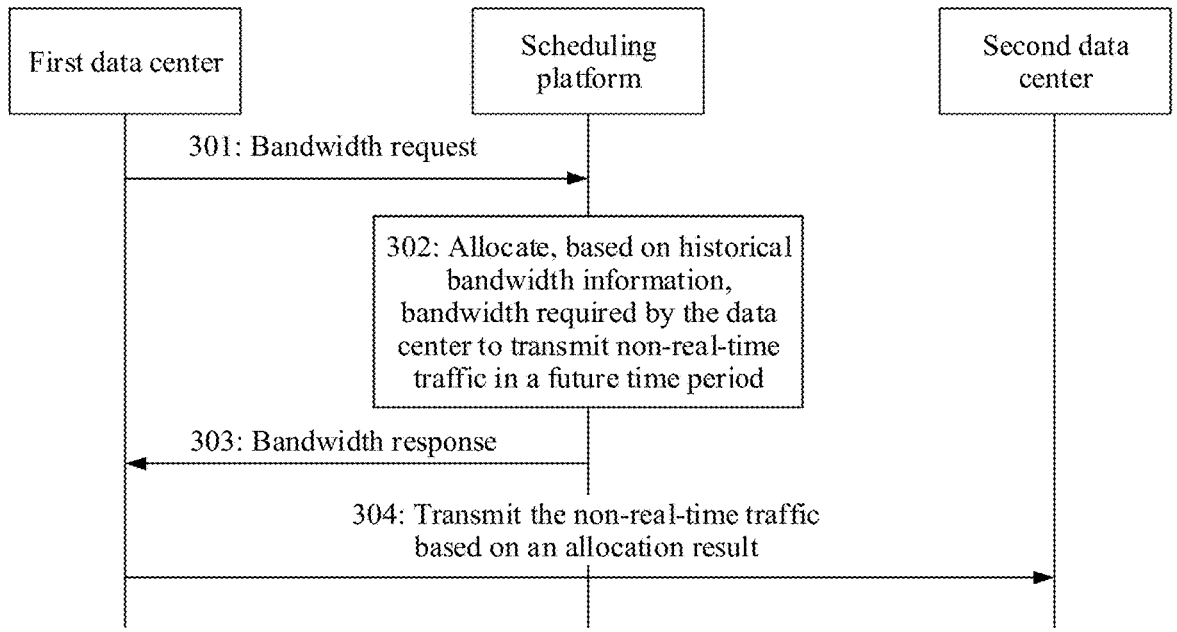
FIG. 3 is a schematic flowchart of a bandwidth scheduling method according to an embodiment of this disclosure.

FIG. 3 is a schematic flowchart of a bandwidth scheduling method according to an embodiment of this disclosure. On the basis of the system architecture shown in FIG. 2, as shown in FIG. 3, the bandwidth scheduling method in this disclosure includes the following steps.

301: A first data center sends a bandwidth request to a scheduling platform.

The first data center is any data center in the region 10.

When a current moment is a scheduling moment, the region 10 sends the bandwidth request to the scheduling platform. The bandwidth request includes identifier information of each piece of traffic that is currently to be transmitted by the first data center and a size of bandwidth required by each piece of traffic. The identifier information includes a timestamp, a 5-tuple, a packet size, a sampling ratio, and a correspondence between a 5-tuple and an application identifier (ID). A correspondence exists between the identifier information, a real-time application, and a non-real-time application. Whether each piece of traffic is real-time traffic or non-real-time traffic is determined based on the identifier information of each piece of traffic and the correspondence, and bandwidth required by the real-time traffic and the non-real-time traffic to-be-transmitted at the current moment is determined based on the bandwidth request.

The bandwidth request is used to request the scheduling platform to allocate the bandwidth required by the first data center to transmit the non-real-time traffic, and create, based on an allocation result, a transmission channel for the first data center to transmit the non-real-time traffic.

302: The scheduling platform allocates, based on historical bandwidth information, the bandwidth required by the first data center to transmit the non-real-time traffic in a future time period.

The scheduling platform predicts, based on the historical bandwidth information, occupation of total bandwidth in the region (region 10) in which the first data center is located by the first data center at each moment in the future time period.

The total bandwidth in the region 10 is fixed at each moment. Total bandwidth in different regions may be the same or may be different. This is not limited in this disclosure.

Further, the scheduling platform determines schedulable bandwidth in the region 10 in the future time period based on the predicted occupation of the total bandwidth in the region 10 in the future time period and the total bandwidth in the region 10, and allocates, based on the schedulable bandwidth in the future time period, the bandwidth required by the first data center to transmit the non-real-time traffic.

Optionally, when transmission priorities between non-real-time traffic are not considered, the historical bandwidth information includes first bandwidth information, where the first bandwidth information includes predicted occupation of the total bandwidth for the real-time traffic at each moment in the future time period. The occupation is obtained by analyzing occupation of the total bandwidth for the real-time traffic in a historical time period.

Further, the schedulable bandwidth at each moment in the future time period is determined based on the occupation of the total bandwidth for the real-time traffic at each moment in the future time period, the occupation of the total bandwidth at each moment, and the total bandwidth in the region 10. Schedulable bandwidth=(a*total bandwidth−first unschedulable bandwidth), where a is a preset parameter and is less than 1. The preset parameter a is mainly set to reserve bandwidth in the region 10 when the bandwidth in the region 10 is allocated, to avoid excessive pressure to traffic transmission in the first data center because the entire bandwidth in the region 10 is fully occupied. The first unschedulable bandwidth is the predicted bandwidth occupied by the real-time traffic in the future time period.

Figure 4:
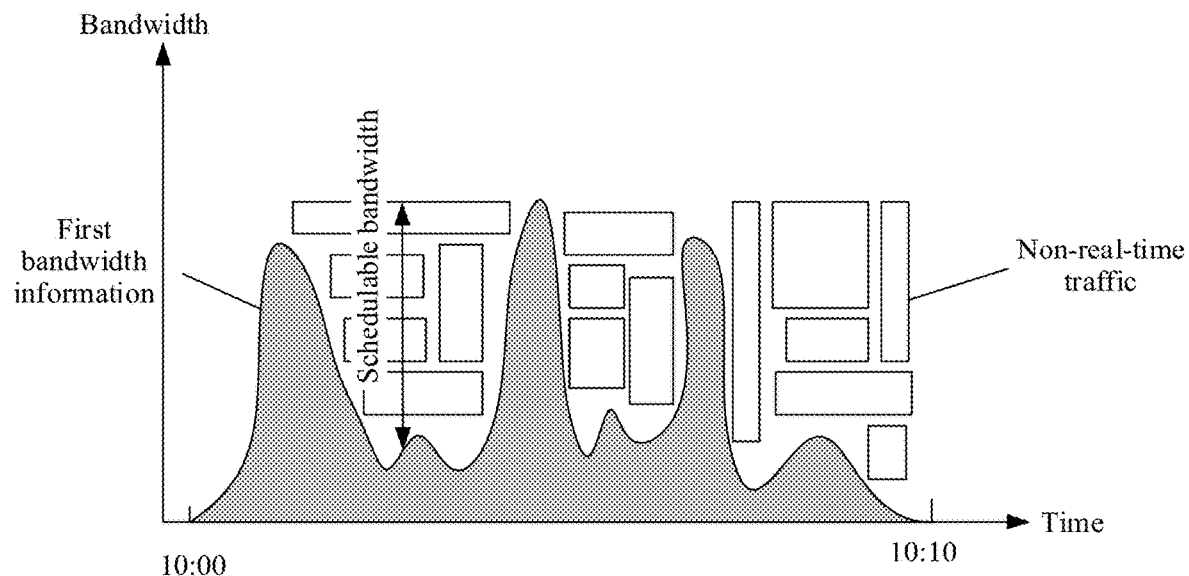
FIG. 4 is a schematic diagram of bandwidth allocation according to an embodiment of this disclosure.

As shown in FIG. 4, after the schedulable bandwidth in the region 10 at each moment in the future time period is determined, the bandwidth required by the first data center to transmit the non-real-time traffic is allocated. That is, traffic balancing is performed on the total bandwidth based on the bandwidth required to transmit the non-real-time traffic and the predicted occupation of the total bandwidth by the real-time traffic in the future time period. The bandwidth required to transmit the non-real-time traffic is allocated to the future time period, so as to balance occupation of the total bandwidth in the region 10 at each moment in the future time period, and avoid a case in which a traffic peak is far higher than a traffic valley.

Figure 5:
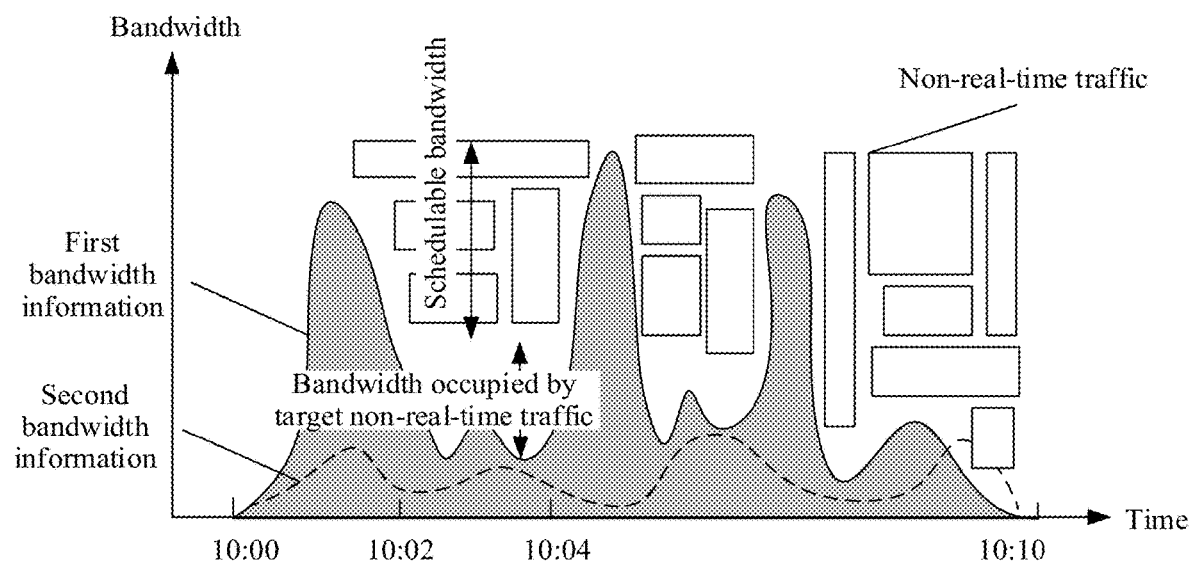
FIG. 5 is a schematic diagram of another bandwidth allocation according to an embodiment of this disclosure.

Optionally, when transmission priorities are set between non-real-time traffic, as shown in FIG. 5, the historical bandwidth information further includes second bandwidth information, where the second bandwidth information includes predicted occupation of the total bandwidth by added non-real-time traffic in the future time period at each moment in the future time period.

Therefore, the schedulable bandwidth at each moment in the future time period needs to be determined based on occupation of the total bandwidth in the region 10 for the real-time traffic and the non-real-time traffic at each moment in the future time period. Schedulable bandwidth=(a*total bandwidth−second unschedulable bandwidth), where the second unschedulable bandwidth includes a sum of bandwidth occupied by the real-time traffic at each moment in the future time period and bandwidth occupied by a target non-real-time traffic at each moment in the future time period.

The target non-real-time traffic is non-real-time traffic, in the added non-real-time traffic, has a higher transmission priority than that of non-real-time traffic to be transmitted at a current moment. In other words, the transmission priorities are also set between the non-real-time traffic, and the non-real-time traffic with the higher priority is preferably transmitted in the future time period.

A transmission priority of each piece of non-real-time traffic is preset. For example, a correspondence between a transmission priority of non-real-time traffic and an application ID may be preset, and the transmission priority between pieces of non-real-time traffic is obtained based on application IDs of the pieces of non-real-time traffic and the correspondence.

For example, the future time period is 10:00 a.m. to 11:00 a.m. It is determined at the scheduling moment that 50 MB non-real-time traffic B needs to be transmitted, and it is predicted, based on the second bandwidth information, that 60 MB non-real-time traffic C needs to be transmitted within a time period 10:02 a.m. to 10:04 a.m. (that is, the 60 MB non-real-time traffic is added and needs to be transmitted within 10:02 a.m. to 10:04 a.m.). If a transmission priority of the non-real-time traffic C is higher than a data transmission priority of the non-real-time traffic B, the second unschedulable bandwidth corresponding to the time period 10:02 a.m. to 10:04 a.m. includes the 60 MB bandwidth occupied by the non-real-time traffic C; or if a transmission priority of the non-real-time traffic C is lower than a data transmission priority of the non-real-time traffic B, the second unschedulable bandwidth corresponding to the time period 10:02 a.m. to 10:04 a.m. does not include the 60 MB bandwidth occupied by the non-real-time traffic C.

Further, after the schedulable bandwidth at each moment in the future time period is obtained, a plurality of corresponding time slices are allocated to the non-real-time traffic in the future time period, and available bandwidth is allocated to transmit the non-real-time traffic based on the schedulable bandwidth corresponding to each moment in each time slice.

Then, the first data center may transmit the non-real-time traffic in the plurality of scheduled time slices by using the bandwidth allocated to each time slice.

For example, if the future time period is 10:00 a.m. to 10:10 a.m., a time slice allocated to transmit non-real-time traffic B is 10:00 a.m. to 10:02 a.m., and 2 MB available bandwidth is allocated to the time slice, the first data center may transmit the non-real-time traffic B to a second data center by using the 2 MB available bandwidth in the time slice 10:00 a.m. to 10:02 a.m.

In addition, when the bandwidth required to transmit the non-real-time traffic is allocated, whether the non-real-time traffic supports resumable transmission is determined. If the non-real-time traffic supports resumable transmission, continuous time slices or discontinuous time slices may be allocated to the non-real-time traffic; or if the non-real-time traffic does not support resumable transmission, continuous time slices need to be allocated to the non-real-time traffic.

For example, if non-real-time traffic B supports resumable transmission, time slices allocated to the non-real-time traffic B may be 10:00 a.m. to 10:03 a.m. and 10:07 a.m. to 10:10 a.m. That is, the non-real-time traffic B is transmitted within the time slice 10:00 a.m. to 10:03 a.m., and then the non-real-time traffic B continues to be transmitted within the time slice 10:07 a.m. to 10:10 a.m. If the non-real-time traffic B does not support resumable transmission, continuous time slices need to be allocated to the non-real-time traffic B, and a traffic transmission process cannot be interrupted.

Further, after the plurality of time slices are allocated for the first data center to transmit the non-real-time traffic and the corresponding available bandwidth is allocated to each time slice, the transmission channel corresponding to each time slice is created. That is, physical line resources in the region 10 are allocated, and the transmission channel corresponding to the available bandwidth of the time slice is created for each time slice, so that the first data center sends the non-real-time traffic to the second data center in each time slice through the transmission channel.

303: The scheduling platform sends a bandwidth response to the first data center.

The bandwidth response includes the allocation result, and the allocation result includes the plurality of time slices, the available bandwidth of each time slice, and the transmission channel corresponding to each time slice. The transmission channel includes a channel name, a channel type, and link bandwidth. The channel type is used to represent a type of to-be-transmitted traffic, and the traffic type includes real-time traffic and non-real-time traffic.

304: The first data center transmits the non-real-time traffic to the second data center based on the allocation result.

The first data center sends the non-real-time traffic to the second data center in each time slice through the transmission channel corresponding to the time slice.

It can be learned that, in this embodiment of this disclosure, when the scheduling moment arrives, the bandwidth required by the data center to transmit the non-real-time traffic in the future time period is allocated. When the real-time traffic occupies large total bandwidth at a moment or a time period in the future time period, small bandwidth is allocated to transmit the non-real-time traffic; or when the real-time traffic occupies small total bandwidth at a moment or a time period in the future time period, large bandwidth is allocated to transmit the non-real-time traffic. That is, in the future time period, traffic balancing is performed on the occupation of the total bandwidth in the region in which the data center is located, so as to avoid a case in which a difference between the traffic peak and the traffic valley value is large. Therefore, occupation of the total bandwidth is stable at each moment, and the traffic can be transmitted through a large quantity of physical lines in the traffic valley, thereby improving utilization of the physical line resources.

In a possible implementation, the bandwidth request further includes bandwidth required by the data center to transmit current real-time traffic. Before the bandwidth required to transmit the non-real-time traffic is allocated, the bandwidth (actually required bandwidth) required by the data center to transmit the current real-time traffic further needs to be determined based on the bandwidth request, and the actually required bandwidth is compared with the predicted bandwidth required by the data center to transmit the real-time traffic at the current moment. When a difference between the actually required bandwidth and the predicted required bandwidth is greater than a threshold, the historical bandwidth information is updated based on historical traffic information (historical flow information in a latest time period) in the DCI network corresponding to the region 10 in a preset time period.

Historical traffic information in former N scheduling periods before the scheduling moment in the DCI network corresponding to the region 10 is obtained, where N is an integer greater than or equal to 1. Then, real-time traffic in historical traffic information of each scheduling period is identified, occupation of the total bandwidth in the region 10 by the real-time traffic in each scheduling period is determined, and the historical bandwidth information is updated based on the occupation of the total bandwidth in the region 10 by the real-time traffic in each of the former N scheduling periods. That is, the occupation of the total bandwidth in the region 10 by the real-time traffic in each of the first N scheduling periods is used to predict occupation of the total bandwidth in the region 10 by the real-time traffic at each moment in the future time period.

For example, occupation of the total bandwidth in the region 10 by the real-time traffic in a previous scheduling period is obtained, an occupation trend of the total bandwidth by the real-time traffic is determined based on the occupation, and occupation of the total bandwidth in the region 10 by the real-time traffic at each moment in the future time period is predicted based on the bandwidth occupation trend; or a bandwidth curve is fitted based on bandwidth occupation of the real-time traffic in a previous scheduling period, and the bandwidth curve is extended to the current scheduling period, so that occupation of the total bandwidth in the region 10 by the real-time traffic at each moment in the future time period can be predicted.

It should be noted that the first data center further needs to transmit the real-time traffic to the second data center. Therefore, when each scheduling moment arrives, the scheduling platform may create, based on the first bandwidth information, a transmission channel for the real-time traffic to be transmitted in the future time period. Because a transmission priority of the real-time traffic is high, and the allocated bandwidth cannot be occupied by other traffic. Certainly, the transmission channel may also be created based on the first bandwidth information at a time for the real-time traffic to be transmitted within one day. Then, the first data center may transmit the real-time traffic through the created transmission channel.

Figure 6:
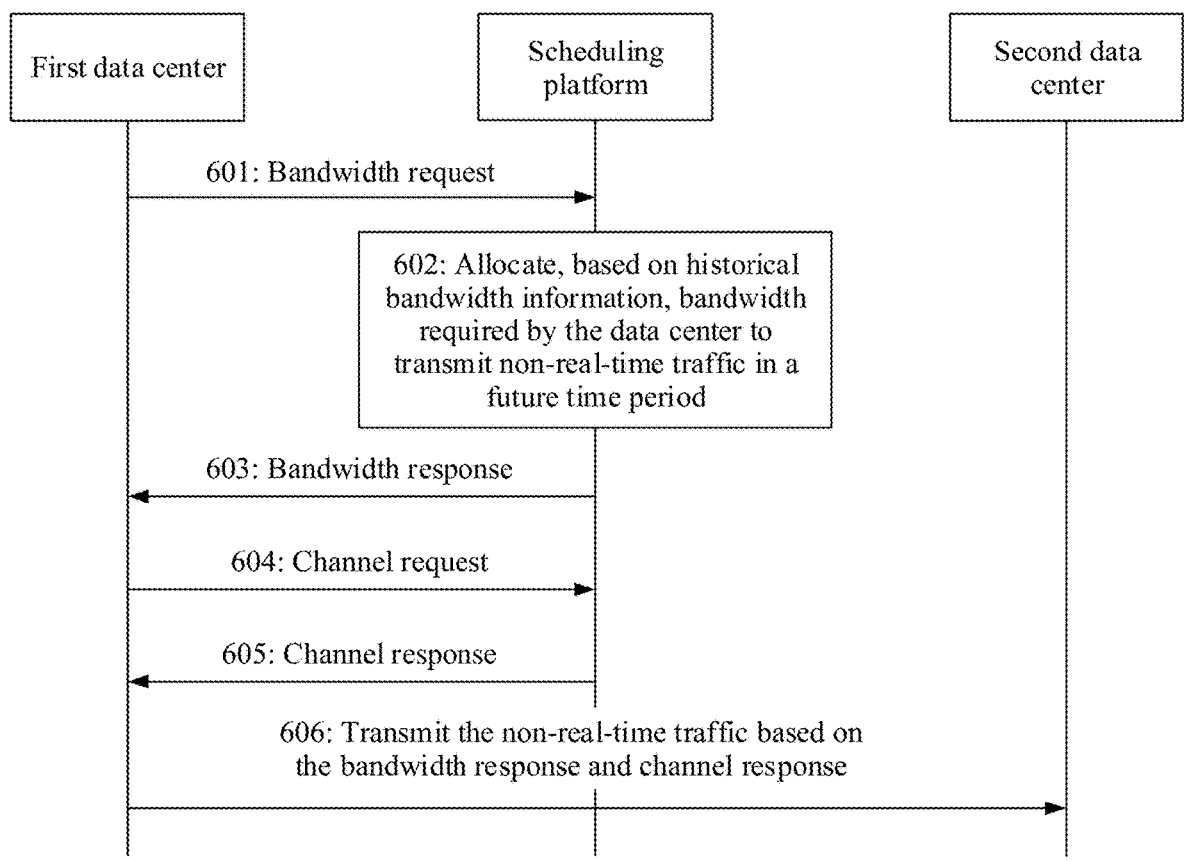
FIG. 6 is a schematic flowchart of another bandwidth scheduling method according to an embodiment of this disclosure.

FIG. 6 is a schematic flowchart of another bandwidth scheduling method according to an embodiment of this disclosure. Content in this embodiment that is the same as that in the embodiment shown in FIG. 3 is not repeatedly described herein. On the basis of the system architecture shown in FIG. 2, as shown in FIG. 6, the bandwidth scheduling method in this disclosure includes the following steps.

601: A first data center sends a bandwidth request to a scheduling platform.

The first data center is any data center in the region 10.

When a current moment is a scheduling moment, the region 10 sends the bandwidth request to the scheduling platform. The bandwidth request includes identifier information of each piece of traffic that is currently to be transmitted by the first data center and a size of bandwidth required by each piece of traffic. The identifier information includes a timestamp, a 5-tuple, a packet size, a sampling ratio, and a correspondence between a 5-tuple and an application ID. A correspondence exists between the identifier information, a real-time application, and a non-real-time application. Whether each piece of traffic is real-time traffic or non-real-time traffic is determined based on the identifier information of each piece of traffic and the correspondence, and bandwidth required by the real-time traffic and the non-real-time traffic to-be-transmitted at the current moment is determined based on the bandwidth request.

The bandwidth request is used to request the scheduling platform to allocate bandwidth required by the first data center to transmit non-real-time traffic, and create, based on an allocation result, a transmission channel for the first data center to transmit the non-real-time traffic.

The bandwidth request is used to request the scheduling platform to allocate the bandwidth required by the first data center to transmit the non-real-time traffic.

602: The scheduling platform allocates, based on historical bandwidth information, the bandwidth required by the data center to transmit the non-real-time traffic in a future time period.

603: The scheduling platform sends a bandwidth response to the first data center.

The bandwidth response includes a plurality of scheduled time slices and available bandwidth corresponding to each time slice.

604: The first data center sends a channel request to the scheduling platform.

After receiving the bandwidth response, the first data center sends the channel request to the scheduling platform, where the channel request is used to request the scheduling platform to create the transmission channel corresponding to the bandwidth response. That is, physical line resources in the region 10 are allocated, and a transmission channel corresponding to each time slice is divided from each time slice allocated to the first data center, so that the first data center transmits the non-real-time traffic to a second data center on each time slice through the transmission channel.

605: The scheduling platform sends a channel response to the first data center.

The channel response includes a channel name, a channel type, and link bandwidth. The channel type is used to represent a type of to-be-transmitted traffic, and the traffic type includes real-time traffic and non-real-time traffic.

606: The first data center transmits the non-real-time traffic to the second data center based on the bandwidth response and the channel response.

Figure 7:
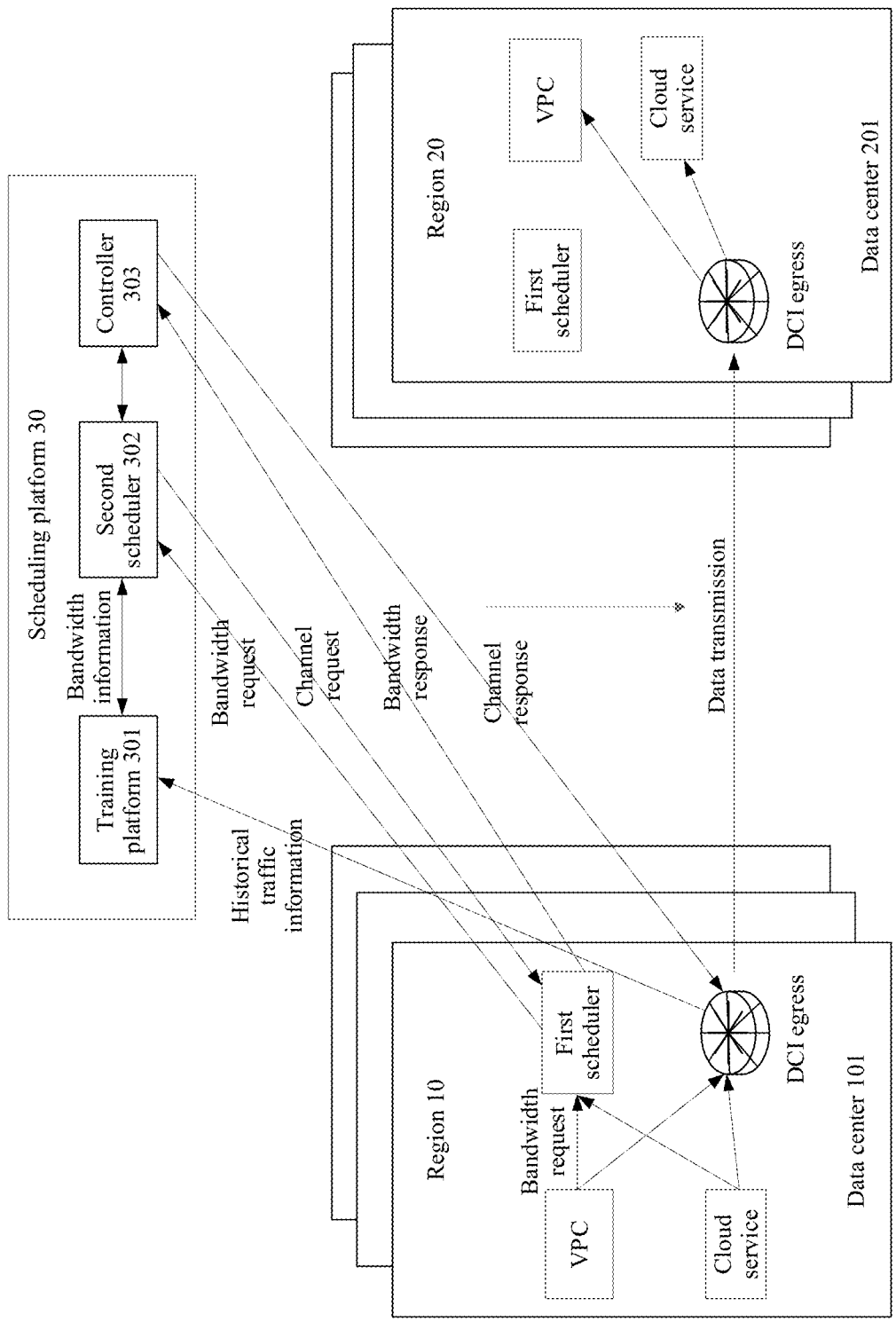
FIG. 7 is a diagram of another bandwidth scheduling system architecture according to an embodiment of this disclosure.

The following describes in detail a bandwidth scheduling process in embodiments of this disclosure with reference to FIG. 7.

Because each region includes one or more data centers, the plurality of data centers may transmit traffic to one or more data centers in another region. Therefore, a first scheduler is first arranged on each region. Adaptively, one or more of a training platform 301, a second scheduler 302, and a controller 303 are arranged on a scheduling platform 30. The training platform 301, the second scheduler 302, and the controller 303 may be integrated and deployed on one component, or may be separately deployed as three independent components. This is not limited in this disclosure.

The training platform 301 obtains historical traffic information at each moment from a DCI network egress in a first data center, performs model training based on the historical traffic information at each moment to obtain a bandwidth prediction model, and predicts the foregoing first bandwidth information and/or second bandwidth information based on the bandwidth prediction model.

Further, when a scheduling moment arrives, the first scheduler in each region may send a bandwidth request and a channel request, and receives a bandwidth response and a channel response in a data center in the region; the second scheduler 302 may allocate bandwidth required to transmit non-real-time traffic; and the controller 303 may create a transmission channel.

Different applications submit different bandwidth requests and have different traffic transmission modes.

Figure 8:
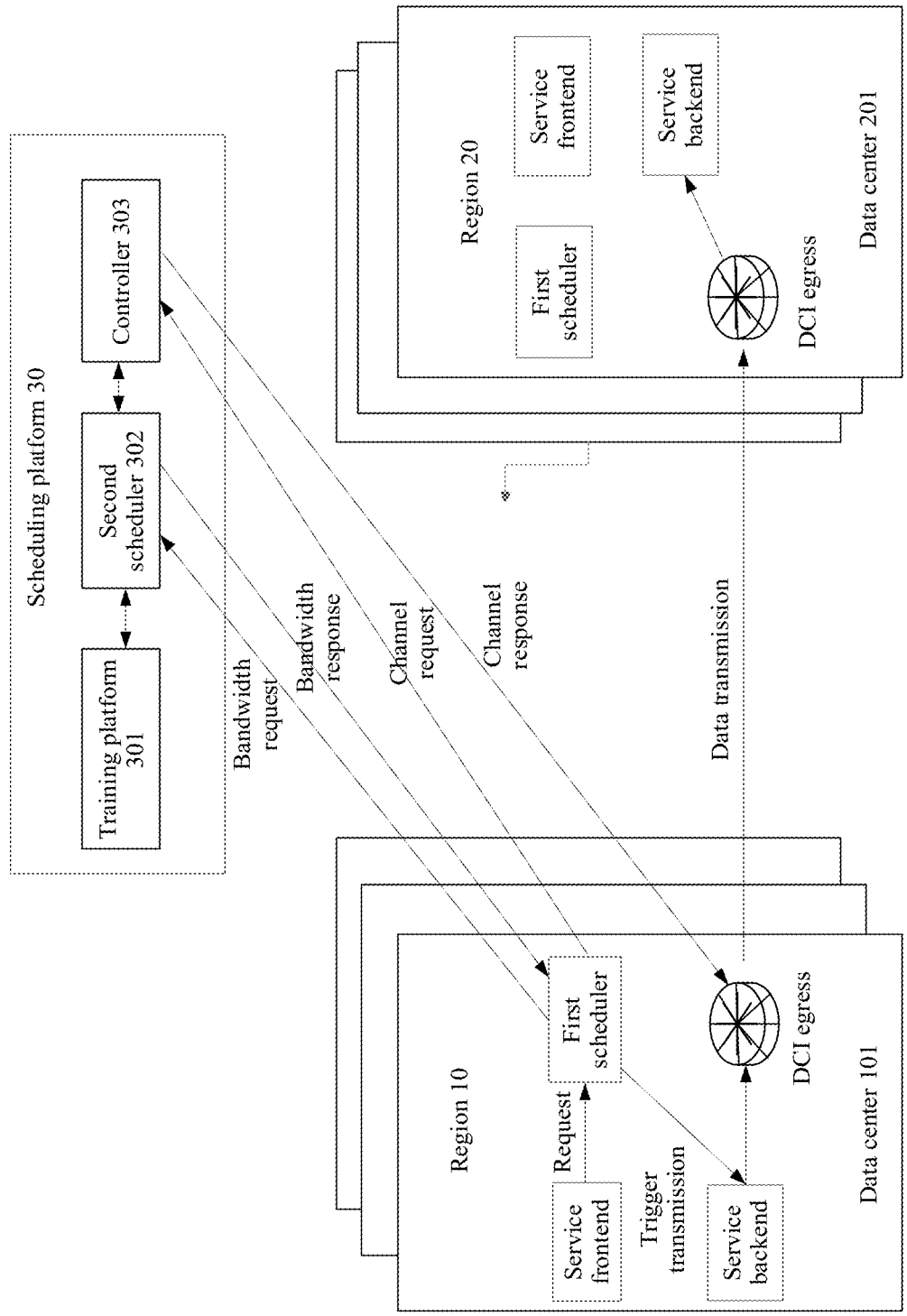
FIG. 8 is a diagram of a system architecture in a passive scheduling mode according to an embodiment of this disclosure.
Figure 9:
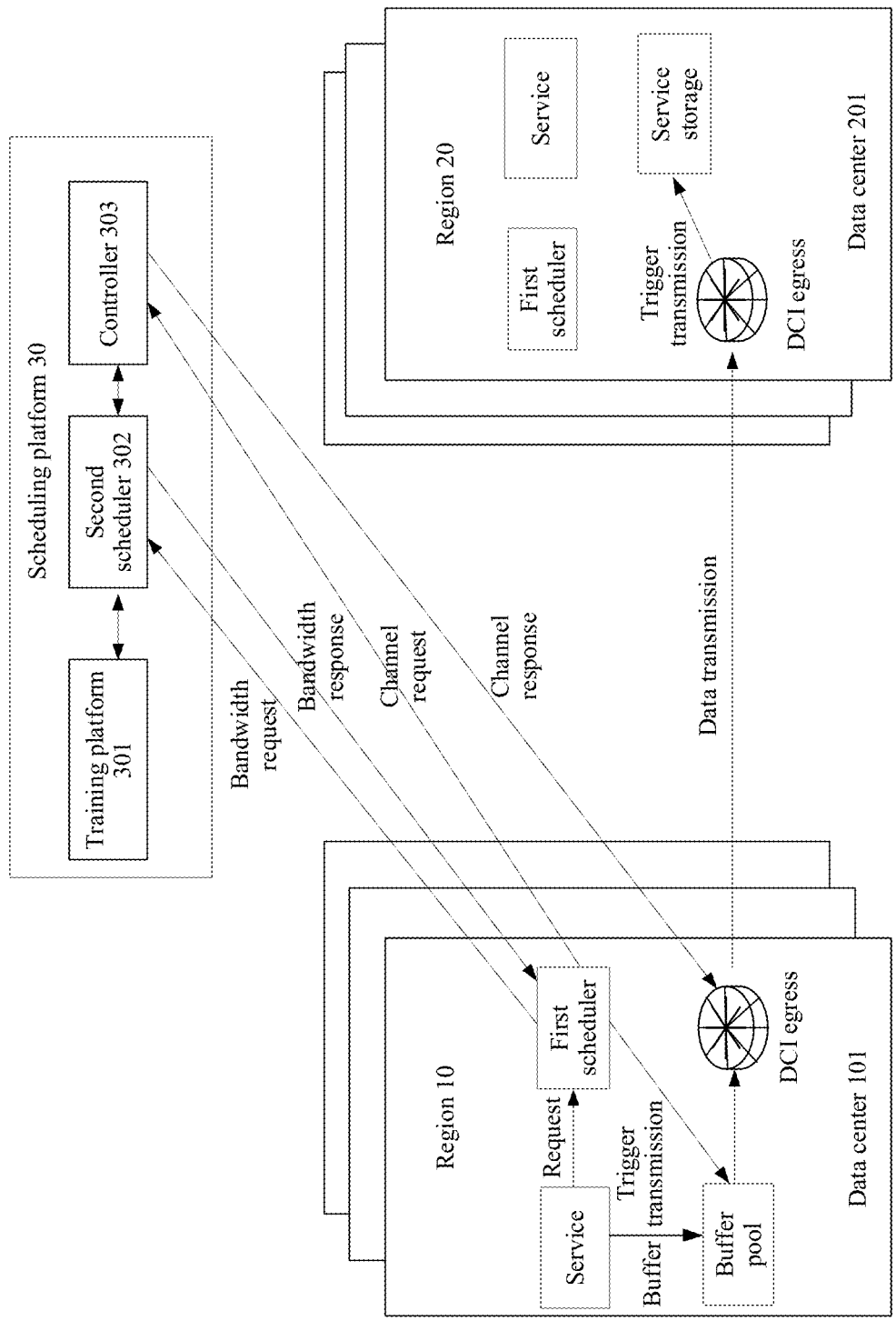
FIG. 9 is a diagram of a system architecture in a buffer scheduling mode according to an embodiment of this disclosure.
Figure 10:
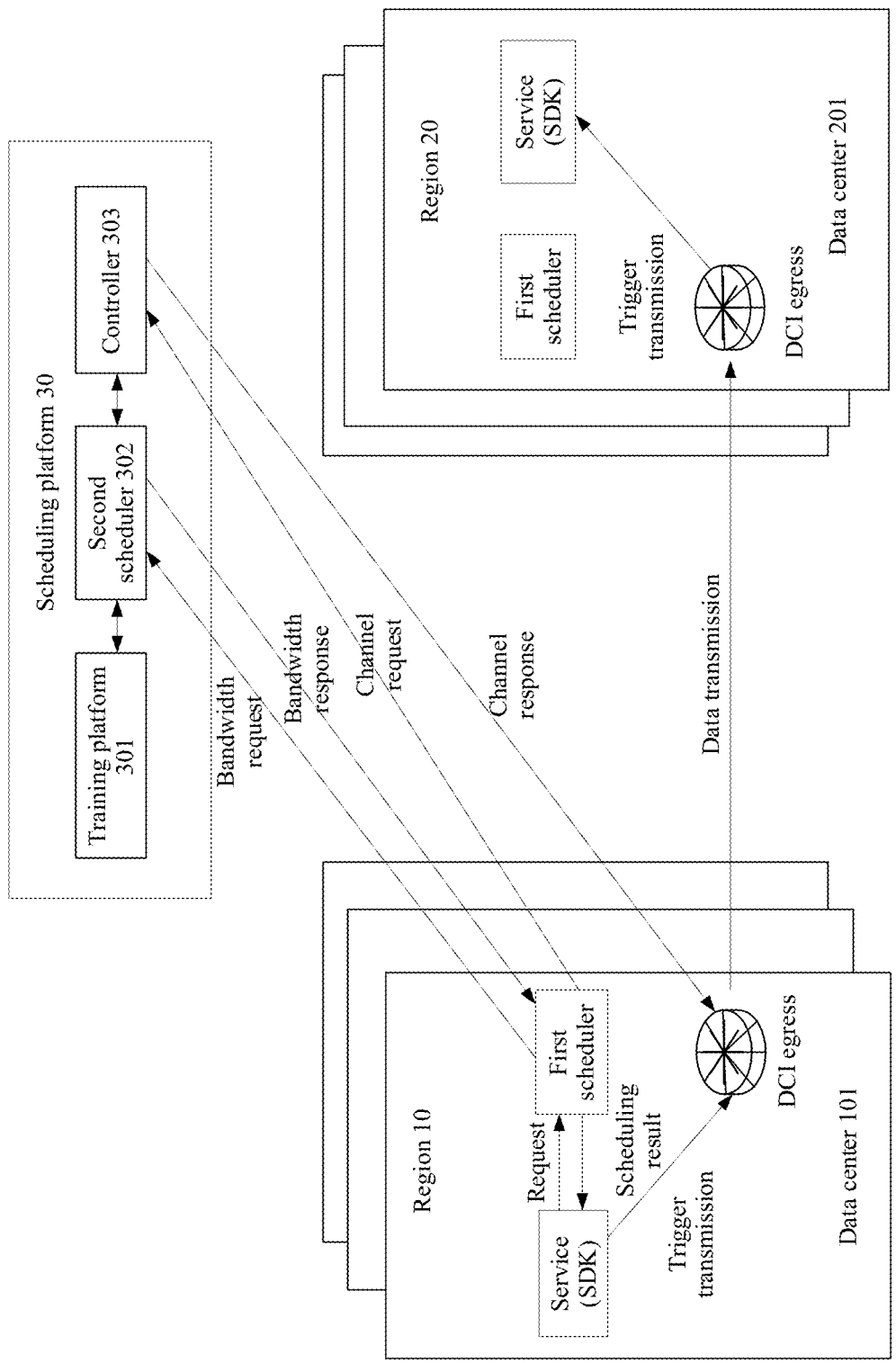
FIG. 10 is a diagram of a system architecture in an interactive scheduling mode according to an embodiment of this disclosure.

The following describes implementation processes of three scheduling modes in detail with reference to FIG. 8 to FIG. 10.

Refer to FIG. 8. After submitting a first transmission request to the first scheduler, a service frontend no longer participates in the bandwidth scheduling process. Therefore, such scheduling mode is also referred to as a passive scheduling mode. For example, when traffic is transmitted by using a file transfer protocol (FTP), an FTP server executes a thread that registers an FTP command with the first scheduler, where the FTP command is used to instruct to transmit non-real-time traffic. After the registration is completed, the thread may be ended without waiting for a thread bandwidth response. That is, registration of the FTP command and transmission of non-real-time traffic are processed in an asynchronous mode. In the FTP server, a part of the thread used to execute registration of the FTP command is referred to as the service frontend. After the first scheduler in the region 10 receives the bandwidth response sent by the scheduling platform, the first scheduler sends the bandwidth response to a service backend, to trigger the service backend to execute a traffic transmission task, that is, the service backend transmits traffic to a data center in a region 20 by using allocated available bandwidth and a created transmission channel. The FTP server is the service backend. Adapting to the scheduling mode, the first transmission request includes but is not limited to a source, a destination, bandwidth, a data size, a command line, whether resumable transmission is supported, and a transmission deadline. The source indicates an IP address of the region 10. The destination indicates an IP address of the region 20. The bandwidth indicates bandwidth required for transmitting traffic. The data size indicates a size of a memory for transmitting the traffic. The deadline is a maximum deadline for transmitting the traffic, that is, the traffic needs to be transmitted within the maximum deadline.

Refer to FIG. 9. When submitting a second transmission request to the first scheduler in the region 10, a service synchronously buffers to-be-transmitted traffic into a buffer pool. Therefore, such scheduling mode is also referred to as a buffer scheduling mode. For example, when traffic is transmitted by using an FTP, and FTP server executes a thread that registers an FTP command with the first scheduler, where the FTP command is used to instruct to transmit non-real-time traffic. After the registration is completed, the thread may be ended without waiting for a thread bandwidth response. After receiving a bandwidth response sent by the scheduling platform 30, the first scheduler in the region 10 triggers a controller (a manager) of the buffer pool to execute a traffic transmission task, extracts to-be-transmitted non-real-time traffic from the buffer pool, and transmits the non-real-time traffic to a data center in a region 20 by using allocated available bandwidth and a created transmission channel. Adapting to the buffer scheduling mode, the second transmission request includes but is not limited to a source, bandwidth, a data size, a command line, a source location (a buffer location in the region 10) of data, a target location (a buffer location in the region 20) of the data, and a deadline.

Refer to FIG. 10. A software development kit (SDK) of a service submits a third transmission request to the first scheduler, and receives an allocation result fed back by the first scheduler. Therefore, such scheduling mode is also referred to as an interactive scheduling mode. For example, when traffic is transmitted by using an FTP, an FTP server executes a thread that registers an FTP command with the first scheduler, where the FTP command is used to instruct to transmit non-real-time traffic. After the thread that registers the FTP command is completed, a feedback response from the first scheduler still needs to wait for. That is, registration of the FTP command and traffic transmission are processed in a serial mode. After the bandwidth response fed back by the first scheduler is received, a traffic transmission task is triggered, and the non-real-time traffic is transmitted to a data center in a region 20 by using allocated available bandwidth and a created transmission channel. Adapting to the interactive scheduling mode, the data transmission request includes but is not limited to a source, a destination, bandwidth, a file size, a command line, whether resumable transmission is supported, and a deadline.

The bandwidth prediction model in the foregoing example may be implemented by using a deep neural network or a segmentation model. The following separately provides detailed descriptions.

In a first manner, the bandwidth prediction model may be implemented by using the deep neural network.

In an implementation of this disclosure, the bandwidth prediction model may be expressed as:

$b_1 = g_1(a_1)$, where $b_1$ is a predicted traffic value at each moment, $a_1$ is a historical traffic value corresponding to each moment in a DCI network, and $g_1$ is a mapping relationship between a predicted traffic value and a historical traffic value. The mapping relationship $g_1$ may be obtained by training a large quantity of known historical traffic values at each moment and a large quantity of known predicted traffic values at each moment. In a embodiment, the large quantity of known historical traffic values at each moment may be historical traffic values at each moment in last month. Correspondingly, the large quantity of known predicted traffic at each moment may be obtained by predicting traffic at each moment in the last month.

Historical traffic information of the DCI network corresponding to the region 10 at each moment is obtained, where the historical traffic information includes historical traffic identifier information and historical traffic bandwidth information. The identifier information includes a timestamp, a 5-tuple, a packet size, a sampling ratio, and a correspondence between a 5-tuple and an application ID, and the bandwidth information includes channel interface information (a channel name, an interface type, and link bandwidth).

Real-time traffic and non-real-time traffic in historical traffic transmitted at each moment in the DCI network corresponding to the region 10 are determined based on the traffic identifier information, and bandwidth used for transmitting the historical real-time traffic and bandwidth used for transmitting the non-real-time traffic are determined based on the bandwidth information, so as to obtain occupation of the total bandwidth in the region 10 by the historical real-time traffic and the historical non-real-time traffic at each moment.

When the bandwidth prediction model is used to predict the first bandwidth information of the real-time traffic, the predicted traffic value is a predicted traffic value of the real-time traffic. When the bandwidth prediction model is used to predict the second bandwidth information of the non-real-time traffic, the predicted traffic value is a predicted traffic value of the non-real-time traffic.

In a second manner, the bandwidth prediction model may be implemented by using the segmentation model.

(1) The bandwidth prediction model may be expressed as follows.

Calculate an average value:

$$\bar{X} = \frac{x_1 + x_2 + \ldots + x_n}{n},$$

where $\bar{X}$ is the average value, and $x_1$ to $x_n$ are historical traffic values collected at n sampling moments. For example, when the historical bandwidth information is predicted based on historical traffic values in last month, n is a total quantity of times that the historical traffic value may be collected in the last month.

Calculate a variance:

$$\sigma_1 = \sqrt{\frac{(x_1-\bar{X})^2+(x_2-\bar{X})^2+\ldots+(x_n-\bar{X})^2}{n}},$$

where $\sigma_1$ is the variance, and $x_i$ to $x_{n-1}$ are historical traffic values collected by separately performing n times of sampling at a moment. For example, when the historical bandwidth information is predicted based on historical traffic values in last month, n is a total quantity of collection times in the last month at the moment.

Calculate a confidence interval:

$$p=\bar{X}-t*\sigma_1, \ q=\bar{X}+t*\sigma_1, \text{ where}$$

p is a lower limit of the confidence interval, q is an upper limit of the confidence interval, $\bar{X}$ is an average value, t is a natural number greater than zero, and $\sigma_1$ is a variance.

Herein, it may be assumed that a predicted traffic value is equal to the upper limit of the confidence interval, so as to obtain the predicted traffic value at the moment. Then, predicted traffic values corresponding to the moments are combined, so as to obtain the historical bandwidth information.

It may be understood that the foregoing example is described by using an example in which the predicted traffic value is equal to the upper limit of the confidence interval. However, in actual application, the predicted traffic value may be equal to the lower limit of the confidence interval and any value between the upper limit and the lower limit of the confidence interval. This is not limited herein.

When the segmentation model is used to predict the first bandwidth information of the real-time traffic, the foregoing predicted traffic value at each moment is a predicted traffic value of the real-time traffic at each moment. When the segmentation model is used to predict the second bandwidth information of the non-real-time traffic, the foregoing predicted traffic value at each moment is a predicted traffic value of the non-real-time traffic at each moment.

The foregoing bandwidth scheduling or traffic transmission method can be used to resolve problems in the conventional technology.

When traffic to be transmitted in a DCI network corresponding to any region is at a peak, non-real-time traffic to be transmitted at the traffic peak in the region is allocated to a traffic valley in the DCI network for transmission, so as to weaken the traffic peak and ensure that a difference between the traffic peak and the traffic valley in the DCI network corresponding to the region is not large, thereby resolving a data packet loss problem in the traffic peak without expanding a physical line. Because the non-real-time traffic in the traffic peak is distributed to the traffic valley for transmission, utilization of the physical line during the traffic valley is improved.

Figure 11:
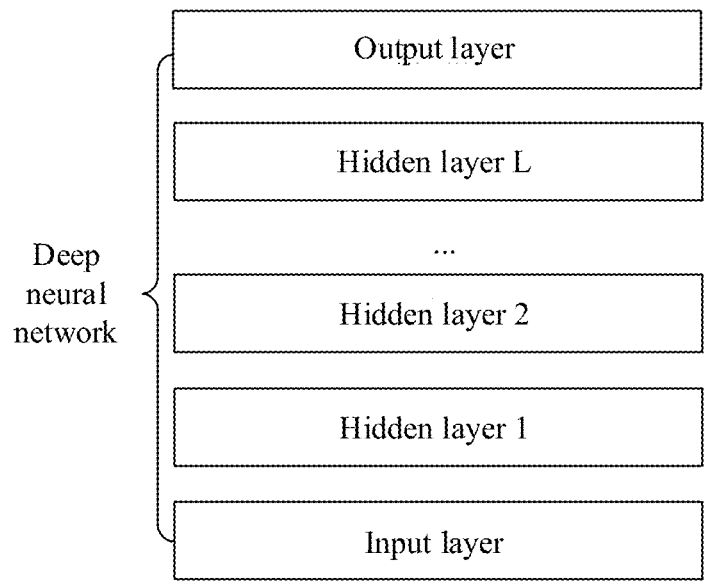
FIG. 11 is a diagram of a network structure of a neural network according to an embodiment of this disclosure.

In an implementation of this disclosure, as shown in FIG. 11, a bandwidth prediction model may be implemented by using a deep neural network (DNN). In an embodiment, the deep neural network includes an input layer, one or more hidden layers, and an output layer.

The Input Layer

It is assumed that input at the input layer is real-time traffic $I_i$, and output is equal to the input. In other words, no processing is performed on the input. For ease of description, it is assumed herein that no processing is performed at the input layer. However, in actual application, processing such as normalization may be performed at the input layer. This is not limited herein.

Hidden Layer

The real-time traffic $I_i$ output at the input layer is used as input at the hidden layer. It is assumed that there are a total of L (L≥2) hidden layers. It is assumed that $Z^l$ represents an output result at an $l^{th}$ layer. When l=1, $Z^1=I_i$, where 1≤l≤L, and a relationship between the $l^{th}$ layer and an $(l+1)^{th}$ layer is as follows:

$$a^{l+1}=W^l Z^l+b^l, \text{ and}$$

$$Z^{l+1}=f^{l+1}(a^{l+1}) \text{ where}$$

$W^l$ is a weight vector at the $l^{th}$ layer, $b^l$ is a bias vector at the $l^{th}$ layer, $a^{l+1}$ is an intermediate vector at the $(l+1)^{th}$ layer, $f^{l+1}$ is an excitation function at the $(l+1)^{th}$ layer, and $Z^{l+1}$ is a hidden-layer result at the $(l+1)^{th}$ layer. An excitation function may be any one of a sigmoid function, a hyperbolic tangent function, a Relu function, an Exponential Linear Unit (ELU) function, or the like.

Output Layer

It is assumed that an output result at the $L^{th}$ layer is $Z^L$, and $Z^L$ is input to a softmax function to obtain a service type:

$$y=\text{soft max}(Z^L), \text{ where}$$

y is an output result at the output layer, $Z^L$ is an output result at an $L^{th}$ hidden layer, and the softmax function is a classification function. It may be understood that the foregoing example is described by using the softmax function as an example. However, in actual application, a logistic function or the like may be used. This is not limited herein.

In an implementation of this disclosure, an essence of training the bandwidth prediction model may be understood as follows: Work at each layer in the deep neural network may be described by using a mathematical expression $\bar{y}=a(W\bar{x}+b)$. The work at each layer in the deep neural network may physically be understood as completing transformation from input space to output space (row space to column space of a matrix) by performing five operations on the input space (a set of input vectors). The five operations include: 1. dimension raising/dimension reduction, 2. scaling out/scaling in, 3. rotation, 4. translation, and 5. "bending". The operations 1, 2, and 3 are completed by $W\bar{x}$, the operation 4 is completed by +b, and the operation 5 is implemented by a( ). The word "space" is used herein for expression because a classified object is not a single object, but a type of object. Space is a collection of all individuals of such things. W is a weight vector, and each value in the vector represents a weight value of one neuron in a neural network at this layer. The vector W determines space transformation from the input space to the output space described above, a weight W of each layer controls how to transform space. The deep neural network is trained to finally obtain a weight matrix (a weight matrix including vectors W of a plurality of layers) of all layers of the trained neural network. Therefore, a process of training the neural network is essentially a manner of learning control of space transformation, learning a weight matrix.

In an implementation of this disclosure, a training process of the bandwidth prediction model may be as follows: Known historical traffic information at each moment may be input into the bandwidth prediction model to obtain a predicted value, and a known historical traffic value at each moment is used as a true desired target value. A current predicted value of the network and an expected target value are compared, so that a weight vector of each layer of neural network can be updated based on a difference between the predicted value and the target value (certainly, there is usually an initialization process before first updating, a parameter is preconfigured for each layer of the deep neural network). For example, if the predicted value of the network is excessively large, the weight vector is adjusted to obtain a smaller predicted value, and is continuously adjusted until the neural network can predict the expected target value. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network becomes a process of reducing the loss as much as possible.

Figure 12:
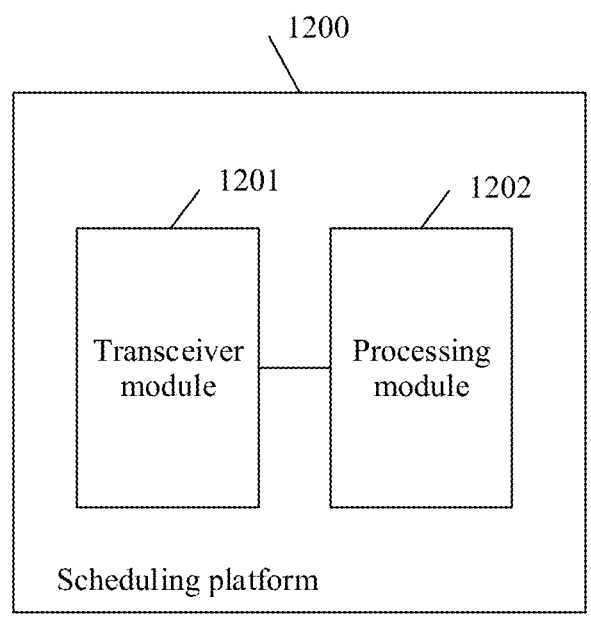
FIG. 12 is a schematic diagram of a structure of a scheduling platform according to an embodiment of this disclosure.

Refer to FIG. 12. FIG. 12 is a schematic diagram of a structure of a scheduling platform according to an embodiment of this disclosure. As shown in FIG. 12, the scheduling platform 1200 includes a transceiver module 1201 and a processing module 1202.

The transceiver module 1201 is configured to receive a bandwidth request sent by a data center, where the bandwidth request includes bandwidth required to transmit non-real-time traffic.

The processing module 1202 is configured to allocate, based on historical bandwidth information, the bandwidth required by the data center to transmit the non-real-time traffic in a future time period, where the historical bandwidth information is used to predict occupation of total bandwidth by the data center in a region in which the data center is located at each moment in the future time period.

The transceiver module 1201 is further configured to send a bandwidth response to the data center, where the bandwidth response includes an allocation result.

In a possible implementation, the historical bandwidth information includes first bandwidth information, the first bandwidth information includes predicted occupation of the total bandwidth by real-time traffic at each moment in the future time period, and a data transmission priority of the real-time traffic is higher than a data transmission priority of the non-real-time traffic; and in an aspect of allocating, based on historical bandwidth information, the bandwidth required by the data center to transmit the non-real-time traffic in a future time period, the processing module 1202 is configured to: determine schedulable bandwidth in the region at each moment in the future time period based on the total bandwidth and the first bandwidth information; and allocate, based on the schedulable bandwidth in the region at each moment in the future time period, the bandwidth required to transmit the non-real-time traffic.

In a possible implementation, the historical bandwidth information includes second bandwidth information, and the second bandwidth information includes predicted occupation of the total bandwidth by new non-real-time traffic added in the future time period at each moment in the future time period; and in an aspect of allocating, based on historical bandwidth information, bandwidth required by the data center to transmit the non-real-time traffic in a future time period, the processing module 1202 is configured to: determine schedulable bandwidth in the region at each moment in the future time period based on the total bandwidth, the first bandwidth information, and the second bandwidth information; and allocate, based on the schedulable bandwidth in the region at each moment in the future time period, the bandwidth required to transmit the non-real-time traffic.

In a possible implementation, in an aspect of allocating, based on the schedulable bandwidth in the region at each moment in the future time period, the bandwidth required to transmit the non-real-time traffic, the processing module 1202 is configured to: allocate a plurality of time slices to transmit the non-real-time traffic in the future time period; determine, based on the schedulable bandwidth in the region at each moment in the future time period, schedulable bandwidth corresponding to each time slice; allocate, based on bandwidth required to transmit the real-time traffic, available bandwidth to transmit the non-real-time traffic from the schedulable bandwidth corresponding to each time slice; and create, based on the plurality of time slices and an available bandwidth corresponding to each time slice, a transmission channel corresponding to each time slice to transmit the non-real-time traffic, where the allocation result includes the plurality of time slices, the available bandwidth corresponding to each time slice, and the transmission channel corresponding to each time slice.

In a possible implementation, when transmission of the non-real-time traffic supports resumable transmission, the plurality of time slices are continuous or discontinuous; or when transmission of the non-real-time traffic does not support resumable transmission, the plurality of time slices are continuous.

In a possible implementation, the bandwidth request further includes bandwidth required by the data center to transmit current real-time traffic; and the processing module 1202 is further configured to: predict, based on the historical bandwidth information, bandwidth required to transmit real-time traffic of the data center at a current moment; determine that a difference between the bandwidth required by the data center to transmit the current real-time traffic and the predicted bandwidth required to transmit the real-time traffic of the data center at the current moment is greater than a threshold; and update the historical bandwidth information based on historical traffic information of the region within a preset time period.

In a possible implementation, the historical bandwidth information includes a timestamp, a 5-tuple, a packet size, a sampling ratio, a correspondence between a 5-tuple and an application ID, and link bandwidth.

Figure 13:
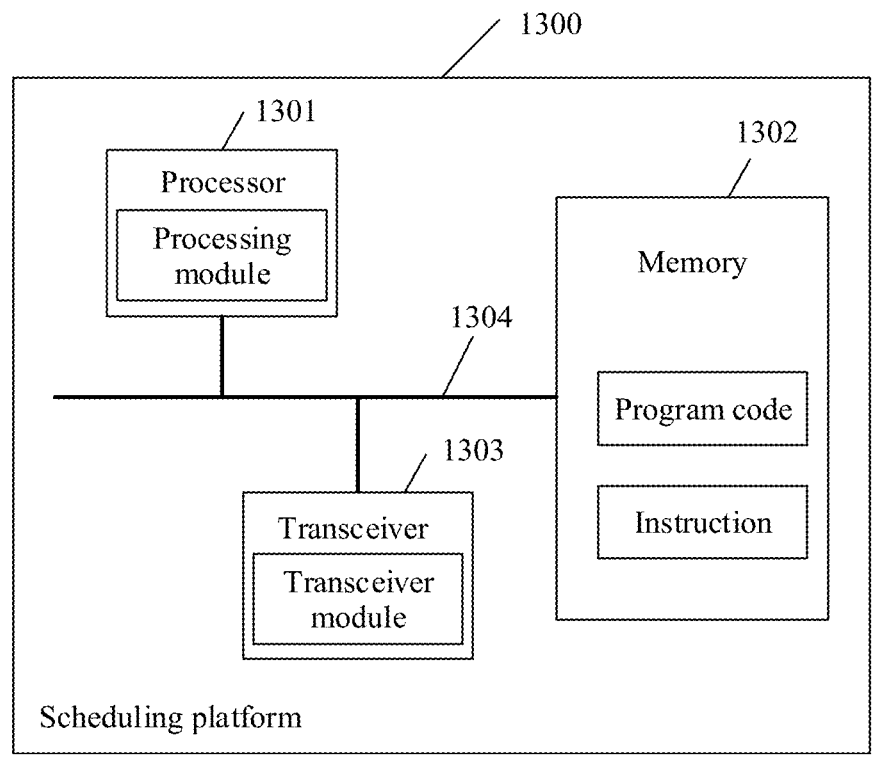
FIG. 13 is a schematic diagram of a structure of another scheduling platform according to an embodiment of this disclosure.

Refer to FIG. 13. FIG. 13 is a schematic diagram of a structure of another scheduling platform according to an embodiment of this disclosure. As shown in FIG. 13, the scheduling platform 1300 includes a processor 1301, a memory 1302, and a transceiver 1303 that are connected to each other through a bus 1304. The memory 1302 stores instructions or programs, and the processor 1301 is configured to execute the instructions or the programs stored in the memory 1302. When the instructions or the programs stored in the memory 1303 are executed, the processor 1302 is configured to perform the operations performed by the processing module 1202 in the foregoing embodiment, and the transceiver 1303 is configured to perform the operations performed by the transceiver module 1201 in the foregoing embodiment.

Figure 14:
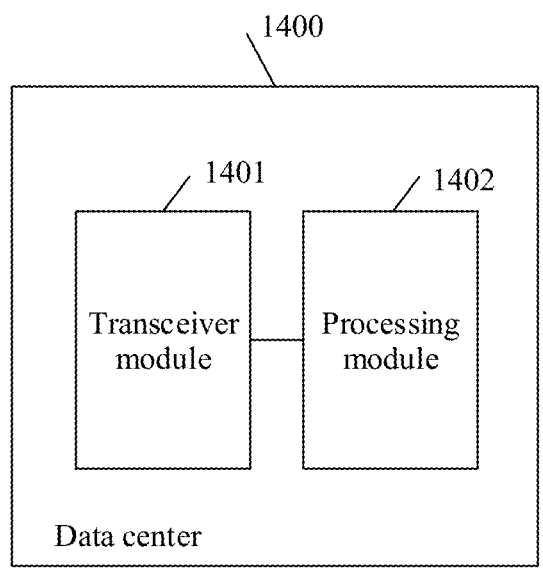
FIG. 14 is a schematic diagram of a structure of a data center according to an embodiment of this disclosure.

Refer to FIG. 14. FIG. 14 is a schematic diagram of a structure of a data center according to an embodiment of this disclosure. As shown in FIG. 14, the data center 1400 includes: a transceiver module 1401, configured to send a bandwidth request to a scheduling platform, where the bandwidth request includes bandwidth required to transmit non-real-time traffic, where the transceiver module 1401 is further configured to receive a bandwidth response sent by the scheduling platform, where the bandwidth response includes an allocation result, the allocation result is obtained by allocating, by the scheduling platform based on historical bandwidth information, the bandwidth required by the data center to transmit the non-real-time traffic in a future time period, and the historical bandwidth information is used to predict occupation of total bandwidth by the data center in a region in which the data center is located at each moment in the future time period; and a processing module 1402, configured to transmit the non-real-time traffic based on the allocation result.

In a possible implementation, the data center includes a first scheduler; and in an aspect of sending a bandwidth request to a scheduling platform, the transceiver module 1401 is configured to: send a first transmission request to the scheduler by using a service frontend, where the first transmission request includes a source address, a destination address, bandwidth, a traffic size, a command line, whether resumable transmission is supported, and a deadline; and send the bandwidth request to the scheduling platform by using the scheduler, where the bandwidth request is registered by the service frontend with the scheduler by using the first transmission request; and in an aspect of transmitting the non-real-time traffic based on the allocation result, the processing module 1402 is configured to: send the allocation result to a service backend by using the first scheduler, to trigger the service backend to execute a traffic transmission task, where the traffic transmission task includes transmitting the non-real-time traffic based on the allocation result.

In a possible implementation, the data center includes a first scheduler; and in an aspect of sending a bandwidth request to a scheduling platform, the transceiver module 1401 is configured to: send a second transmission request to the first scheduler via a service, and buffer the to-be-transmitted non-real-time traffic into a buffer pool, where the second transmission request includes a source address, a destination address, bandwidth, a traffic size, a source traffic location, a destination traffic location, and a deadline; and send the bandwidth request to the scheduling platform by using the first scheduler, where the bandwidth request is obtained by the first scheduler based on the second transmission request; and in an aspect of transmitting the non-real-time traffic based on the allocation result, the processing module 1402 is configured to: send the allocation result to a controller of the buffer pool by using the first scheduler, to trigger the controller to execute a traffic transmission task, where the traffic transmission task includes transmitting the non-real-time traffic based on the allocation result.

In a possible implementation, the data center includes a first scheduler; and in an aspect of sending a bandwidth request to a scheduling platform, the transceiver module 1401 is configured to: send a third transmission request to the first scheduler via a service; and send the bandwidth request to the scheduling platform by using the first scheduler, where the bandwidth request is obtained by the first scheduler based on the third transmission request; and in an aspect of transmitting the non-real-time traffic based on the allocation result, the processing module 1402 is configured to: send the allocation result to the cloud service by using the first scheduler, to trigger the service to execute a traffic transmission task, where the traffic transmission task includes transmitting the non-real-time traffic based on the allocation result.

In a possible implementation, the allocation result includes a plurality of time slices, available bandwidth corresponding to each time, and a transmission channel corresponding to each time slice; and in an aspect of transmitting the non-real-time traffic based on the allocation result, the processing module 1402 is configured to: transmit, based on the plurality of time slices and the available bandwidth corresponding to each time, the non-real-time traffic on the transmission channel corresponding to each time slice.

In a possible implementation, when transmission of the non-real-time traffic supports resumable transmission, the plurality of time slices are continuous or discontinuous; or when transmission of the non-real-time traffic does not support resumable transmission, the plurality of time slices are continuous.

Figure 15:
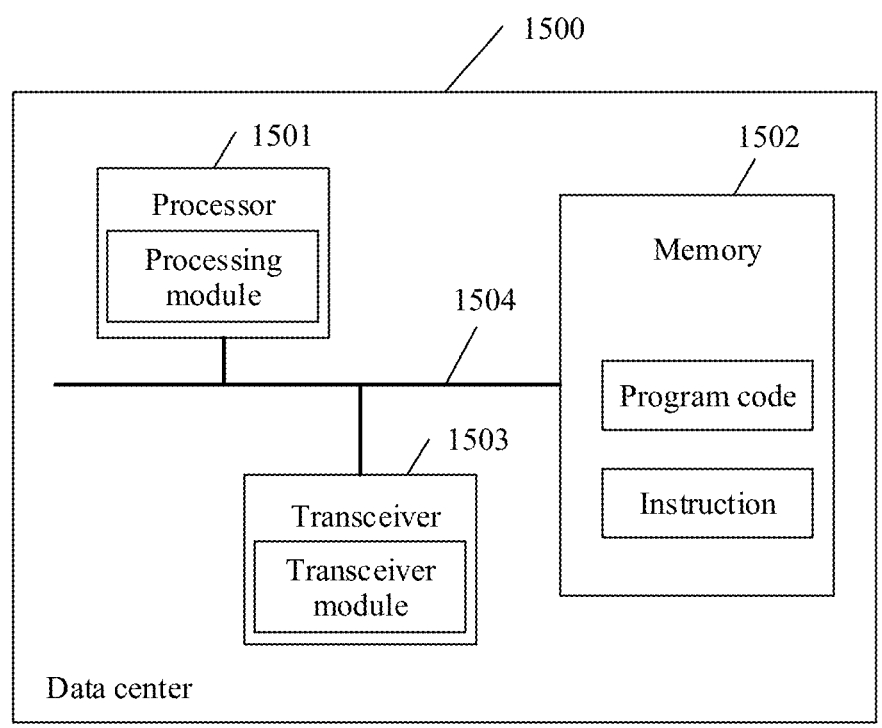
FIG. 15 is a schematic diagram of a structure of another data center according to an embodiment of this disclosure.

Refer to FIG. 15. FIG. 15 is a schematic diagram of a structure of another data center according to an embodiment of this disclosure. As shown in FIG. 15, the data center 1500 includes a processor 1501, a memory 1502, and a transceiver 1503 that are connected to each other through a bus 1504. The memory 1502 stores instructions or programs, and the processor 1501 is configured to execute the instructions or the programs stored in the memory 1502. When the instructions or the programs stored in the memory 1503 are executed, the processor 1502 is configured to perform the operations performed by the processing module 1402 in the foregoing embodiment, and the transceiver 1503 is configured to perform the operations performed by the transceiver module 1401 in the foregoing embodiment.

An embodiment of this disclosure further provides a computer-readable storage medium. The computer-readable storage medium stores a computer program. When the program is executed by a processor, a procedure related to the scheduling platform in the bandwidth scheduling method provided in the foregoing method embodiments can be implemented.

An embodiment of this disclosure further provides a computer-readable storage medium. The computer-readable storage medium stores a computer program. When the program is executed by a processor, a procedure related to the data center in the traffic transmission method provided in the foregoing method embodiments can be implemented.

An embodiment of this disclosure further provides a computer program product. When the computer program product runs on a computer or a processor, the computer or the processor is enabled to perform one or more steps the foregoing bandwidth scheduling method. When component modules of the scheduling platform are implemented in a form of a software functional unit and sold or used as an independent product, the component modules may be stored in the computer-readable storage medium.

An embodiment of this disclosure further provides a computer program product. When the computer program product runs on a computer or a processor, the computer or the processor is enabled to perform one or more steps the foregoing traffic transmission method. When component modules of the data center are implemented in a form of a software functional unit and sold or used as an independent product, the component modules may be stored in the computer-readable storage medium.

It should be understood that, the processor mentioned in embodiments of this disclosure may be a central processing unit (CPU), may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory mentioned in embodiments of this disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, RAMs in many forms may be used, for example, a static random-access memory (SRAM), a dynamic random access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random-access memory (SLDRAM), and a RAMBUS direct random-access memory (RDRAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be further understood that "first", "second", "third", "fourth", and various numbers in this specification are merely used for differentiation for ease of description, and are not construed as a limitation to the scope of this disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this disclosure, sequence numbers of the foregoing processes do not mean execution sequences. The execution sequences of the processes should be determined based on functions and internal logic of the processes, and should not constitute any limitation to implementation processes of embodiments of this disclosure.

Persona of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing systems, apparatuses, and units, refer to a corresponding process in the foregoing method embodiment. Details are not described herein again.

In the several embodiments provided in this disclosure, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may or may not be physical units, that is, they may be located in one position, or may be distributed on a plurality of network units. Some or all of the units may be selected depending on actual requirements to achieve the objectives of the solutions in embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on this understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a ROM, a RAM a magnetic disk, or an optical disc.

A sequence of the steps of the method in embodiments of this disclosure may be adjusted, combined, or deleted according to an actual requirement.

The modules in the apparatus in embodiments of this disclosure may be combined, divided, or deleted according to an actual requirement.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A bandwidth scheduling method implemented by a scheduling platform, wherein the bandwidth scheduling method comprises:
   receiving a bandwidth request from a data center, wherein the bandwidth request request a first bandwidth required to transmit non-real-time traffic;

obtaining historical bandwidth information configured to predict occupation of a total bandwidth by the data center in a region in which the data center is located at one or more time slices in a future time period, wherein the historical bandwidth information comprises first bandwidth information, wherein the first bandwidth information configured to predict occupation of the total bandwidth by real-time traffic at the one or more time slices in the future time period, wherein the real-time traffic is to be transmitted without delay and has a first data transmission priority, and wherein the non-real-time traffic is transmitted with delay and has a second data transmission priority lower than the first data transmission priority;

determining, based on the total bandwidth and the first bandwidth information for the real-time traffic, first schedulable bandwidth in the region at the one or more time slices in the future time period;

allocating, based on the first schedulable bandwidth, the requested first bandwidth for the non-real-time traffic in the future time period to obtain an allocation result; and sending a bandwidth response to the data center;

wherein the bandwidth response comprises the allocation result.

2. The bandwidth scheduling method of to claim 1, wherein the historical bandwidth information comprises second bandwidth information, wherein the second bandwidth information comprises second predicted occupation of the total bandwidth by new real-time traffic added in the future time period at the one or more time slices in the future time period, and wherein allocating the first bandwidth further comprises:

determining, based on the total bandwidth, the first bandwidth information, and the second bandwidth information, the first schedulable bandwidth; and allocating, based on the first schedulable bandwidth, the first bandwidth.

3. The bandwidth scheduling method of claim 1, wherein allocating the first bandwidth further comprises:

allocating a plurality of time slices to transmit the non-real-time traffic in the future time period;

determining, based on the first schedulable bandwidth, second schedulable bandwidth corresponding to each time slice;

allocating, based on a second bandwidth required to transmit the real-time traffic, first available bandwidth to transmit the non-real-time traffic from the second schedulable bandwidth; and creating, based on the plurality of time slices and second available bandwidth corresponding to each time slice, a transmission channel corresponding to each time slice to transmit the non-real-time traffic, wherein the allocation result comprises the plurality of time slices.

4. The bandwidth scheduling method of claim 3, wherein when transmission of the non-real-time traffic supports resumable transmission, the plurality of time slices are continuous.

5. The bandwidth scheduling method of claim 3, wherein when transmission of the non-real-time traffic does not support resumable transmission, the plurality of time slices are continuous.

6. The bandwidth scheduling method of claim 1, wherein the bandwidth request further comprises a second bandwidth required by the data center to transmit current real-time traffic, and wherein the bandwidth scheduling method further comprises:

predicting, based on the historical bandwidth information, a third bandwidth required to transmit the real-time traffic of the data center at a current moment;

determining that a difference between the first bandwidth and the third bandwidth is greater than a threshold; and updating, based on historical traffic information of the region within a preset time period, the historical bandwidth information.

7. The bandwidth scheduling method of claim 1, wherein the historical bandwidth information comprises a timestamp, a 5-tuple, a packet size, a sampling ratio, a correspondence between a 5-tuple and an application ID, and link bandwidth.

8. An electronic device, comprising:

a memory configured to store instructions; and a processor coupled to the memory and configured to execute the instructions to cause the electronic device to:

receive a bandwidth request from a data center, wherein the bandwidth request requests a first bandwidth required to transmit non-real-time traffic;

obtain historical bandwidth information configured to predict occupation of a total bandwidth by the data center in a region in which the data center is located at one or more time slices in a future time period, wherein the historical bandwidth information comprises first bandwidth information, wherein the first bandwidth information configured to predict occupation of the total bandwidth by real-time traffic at the one or more time slices in the further time period, wherein the real-time traffic is to be transmitted without delay and has a first data transmission priority, and wherein the non-real-time traffic is transmitted with delay and has a second data transmission priority lower than the first data transmission priority;

determine, based on the total bandwidth and the first bandwidth information for the real-time traffic, first schedulable bandwidth in the region at the one or more time slices in the future time period;

allocate, based on the first schedulable bandwidth, the requested first bandwidth for the non-real-time traffic in the future time period to obtain an allocation result; and send a bandwidth response to the data center, wherein the bandwidth response comprises the allocation result.

9. The bandwidth scheduling method of claim 1, wherein the requested first bandwidth for the non-real-time traffic is allocated to provide even occupation of the total bandwidth of the data center at the one or more time slices.

10. The bandwidth scheduling method of claim 1, further comprising:

predicting a traffic valley in the future time period; and allocating, in response to predicting the traffic valley, the requested first bandwidth for the non-real-time traffic on physical line resources for the data center.

11. The electronic device of claim 8, wherein the historical bandwidth information further comprises second bandwidth information, wherein the second bandwidth information comprises second predicted occupation of the total bandwidth by new non-real-time traffic added in the future time period at the one or more time slices in the future time period, and wherein the processor is configured to execute the instructions to cause the electronic device to allocate the first bandwidth by:

determining, based on the total bandwidth, the first bandwidth information, and the second bandwidth information, the first schedulable bandwidth; and allocating, based on the first schedulable bandwidth, the first bandwidth.

12. The electronic device of claim 8, wherein the processor is configured to execute the instructions to cause the electronic device to allocate the first bandwidth by:

allocating a plurality of time slices to transmit the non-real-time traffic in the future time period;

determining, based on the first schedulable bandwidth, second schedulable bandwidth corresponding to each time slice;

allocating, based on a second bandwidth required to transmit the real-time traffic, first available bandwidth to transmit the non-real-time traffic from the second schedulable bandwidth; and creating, based on the plurality of time slices and second available bandwidth corresponding to each time slice, a transmission channel corresponding to each time slice to transmit the non-real-time traffic, wherein the allocation result comprises the plurality of time slices.

13. The electronic device of claim 12, wherein when transmission of the non-real-time traffic supports resumable transmission, the plurality of time slices are continuous.

14. The electronic device of claim 12, wherein when transmission of the non-real-time traffic does not support resumable transmission, the plurality of time slices are continuous.

15. The electronic device of claim 8, wherein the bandwidth request further comprises a second bandwidth required by the data center to transmit current real-time traffic, and wherein the processor is configured to execute the instructions to cause the electronic device to:

predict, based on the historical bandwidth information, a third bandwidth required to transmit the real-time traffic of the data center at a current moment;

determine that a difference between the first bandwidth and the third bandwidth is greater than a threshold; and update, based on historical traffic information of the region within a preset time period, the historical bandwidth information.

16. The electronic device of claim 8, wherein the historical bandwidth information comprises a timestamp, a 5-tuple, a packet size, a sampling ratio, a correspondence between a 5-tuple and an application (ID), and link bandwidth.

17. The electronic device of claim 12, wherein the transmission of the non-real-time traffic supports resumable transmission, the plurality of time slices are discontinuous.

18. The bandwidth scheduling method of claim 3, wherein when transmission of the non-real-time traffic supports resumable transmission, the plurality of time slices are discontinuous.

19. A computer program product comprising instructions stored on a non-transitory computer-readable medium that, when executed by a processor, cause an electronic device to:

receive a bandwidth request from a data center, wherein the bandwidth request requests a first bandwidth required to transmit non-real-time traffic;

obtain historical bandwidth information configured to predict occupation of a total bandwidth by the data center in a region in which the data center is located at one or more time slices in a future time period, wherein the historical bandwidth information comprises first bandwidth information, wherein the first bandwidth information configured to predict occupation of the total bandwidth by real-time traffic at the one or more time slices in the future time period, wherein the real-time traffic is to be transmitted without delay and has a first data transmission priority, and wherein the non-real-time traffic is transmitted with delay and has a second data transmission priority lower than the first data transmission priority;

determine, based on the total bandwidth and the first bandwidth information for the real-time traffic, first schedulable bandwidth in the region at the one or more time slices in the future time period;

allocate, based on the first schedulable bandwidth, the requested first bandwidth for the non-real-time traffic in the future time period to obtain an allocation result; and send a bandwidth response to the data center, wherein the bandwidth response comprises the allocation result.

20. The computer program product of claim 19, wherein the bandwidth request further comprises a second bandwidth required by the data center to transmit current real-time traffic, and wherein the instructions further cause the electronic device to:

predict, based on the historical bandwidth information, a third bandwidth required to transmit the real-time traffic of the data center at a current moment;

determine that a difference between the first bandwidth and the third bandwidth is greater than a threshold; and update, based on historical traffic information of the region within a preset time period, the historical bandwidth information.

* * * * *

UNITED STATES PATENT AND TRADEMARK OFFICE
CERTIFICATE OF CORRECTION

| | |
|---|---|
| PATENT NO. | : 11,929,942 B2 |
| APPLICATION NO. | : 17/848870 |
| DATED | : March 12, 2024 |
| INVENTOR(S) | : Xiaoping Zhu |

It is certified that error appears in the above-identified patent and that said Letters Patent is hereby corrected as shown below:

In the Claims

Claim 1, Column 26, Line 66: "the bandwidth request request a first bandwidth" should read "the bandwidth request requests a first bandwidth"

Signed and Sealed this
Thirtieth Day of April, 2024

Katherine Kelly Vidal
*Director of the United States Patent and Trademark Office*